United States Patent
Zhang et al.

(10) Patent No.: US 11,540,147 B2
(45) Date of Patent: Dec. 27, 2022

(54) DOWNLINK CONTROL INFORMATION TRANSMISSION METHOD, METHOD FOR OBTAINING QUANTITY OF BLIND DETECTION TIMES, AND APPARATUS

(71) Applicant: HUAWEI TECHNOLOGIES CO., LTD., Guangdong (CN)

(72) Inventors: Xingwei Zhang, Lund (SE); Xu Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 51 days.

(21) Appl. No.: 16/851,178

(22) Filed: Apr. 17, 2020

(65) Prior Publication Data

US 2020/0244393 A1 Jul. 30, 2020

Related U.S. Application Data

(63) Continuation of application No. PCT/CN2018/110878, filed on Oct. 18, 2018.

(30) Foreign Application Priority Data

Oct. 20, 2017 (CN) .......................... 201710986659.2

(51) Int. Cl.
*H04W 24/00* (2009.01)
*H04L 5/00* (2006.01)
(Continued)

(52) U.S. Cl.
CPC ............. *H04W 24/00* (2013.01); *H04L 5/001* (2013.01); *H04L 27/26025* (2021.01);
(Continued)

(58) Field of Classification Search
CPC ... H04W 24/00; H04L 5/001; H04L 27/26025
See application file for complete search history.

(56) References Cited

U.S. PATENT DOCUMENTS

2011/0255485 A1* 10/2011 Chen .................... H04L 5/0094
370/329
2013/0010714 A1 1/2013 Kim et al.
(Continued)

FOREIGN PATENT DOCUMENTS

CN 103582131 A 2/2014
CN 105991218 A 10/2016
(Continued)

OTHER PUBLICATIONS

Office Action issued in Japanese Application No. 2020-521874 dated Jun. 29, 2021, 7 pages (with English translation).
(Continued)

*Primary Examiner* — Kevin C. Harper
(74) *Attorney, Agent, or Firm* — Fish & Richardson P.C.

(57) ABSTRACT

The present disclosure relates to methods for obtaining a quantity of blind detection times, and apparatus. One example method comprises receiving, by a terminal device, second information from a network device, where the second information comprises subcarrier spacing information, and determining, by the terminal device based on the subcarrier spacing information, a maximum quantity of blind detection times for the terminal device in a search space.

12 Claims, 6 Drawing Sheets

A terminal device receives second information sent by a network device, where the second information includes search space configuration information — S601

The terminal device determines, based on the search space configuration information, a maximum quantity of times of blind detection that can be performed by the terminal device in a search space indicated by the search space configuration information — S602

(51) Int. Cl.
*H04L 27/26* (2006.01)
*H04L 1/00* (2006.01)
(52) U.S. Cl.
CPC .......... *H04L 1/0035* (2013.01); *H04L 1/0038* (2013.01); *H04L 5/0092* (2013.01)

(56) References Cited

U.S. PATENT DOCUMENTS

| | | | | |
|---|---|---|---|---|
| 2013/0016655 | A1* | 1/2013 | Heo | H04L 5/001 370/328 |
| 2013/0155868 | A1* | 6/2013 | Seo | H03M 13/3723 370/241 |
| 2016/0316460 | A1 | 10/2016 | Lee et al. | |
| 2019/0356524 | A1* | 11/2019 | Yi | H04B 7/0695 |
| 2019/0372742 | A1 | 12/2019 | Lee et al. | |
| 2020/0029307 | A1* | 1/2020 | Takeda | H04W 48/12 |

FOREIGN PATENT DOCUMENTS

| | | | |
|---|---|---|---|
| CN | 106797248 | A | 5/2017 |
| CN | 106856670 | A | 6/2017 |
| CN | 106911999 | A | 6/2017 |
| JP | 2018506246 | A | 3/2018 |
| WO | 2011121774 | A1 | 10/2011 |
| WO | 2016114560 | A1 | 7/2016 |
| WO | 2017167271 | A1 | 10/2017 |

OTHER PUBLICATIONS

Office Action issued in Korean Application No. 2020-7013826 dated May 11, 2021, 9 pages (with English translation).
Vivo, "Discussion on search space and blind decoding design," 3GPP TSG RAN WG1 Meeting #90, R1-1712847, Prague, Czech Republic, Aug. 21-25, 2017, 6 pages.
Vivo, "Remaining issues on search space design," 3GPP TSG RAN WG1 Meeting #90bis, R1-1717484, Prague, Czech Republic, Oct. 9-13, 2017, 9 pages.
Office Action issued in Chinese Application No. 202010476421.7 dated Dec. 31, 2020, 16 pages (with English translation).
Extended European Search Report issued in European Application No. 18868483.1 dated Oct. 26, 2020, 7 pages.
Mediatek Inc, "Discussions on search space and Coreset designs," 3GPP TSG RAN WG1 Meeting #90bis, R1-1718323, Prague, CZ, Oct. 9-13, 2017, 11 pages.
Huawei et al., "Search space and blind decoding design,", 3GPP TSG RAN WG1 Meeting #90, R1-1712183, Prague, Czech Republic, Aug. 21-25, 2017, 6 pages.
Qualcomm et al., "WF on use of SS blocks in beam management", 3GPP TSG RAN WG1 NR, R1-1706733, Spokane, USA, Apr. 3-7, 2017, 2 pages.
3GPP TS 38.213 V1.0.0, 3rd Generation Partnership Project, Technical Specification Group Radio Access Network, NR, Physical layer procedures for control(Release 15), Sep. 2017, 6 pages.
3GPP TS 38.331 V0.1.0, 3rd Generation Partnership Project,Technical Specification Group Radio Access Network, NR, Radio Resource Control (RRC), Protocol specification (Release 15), Sep. 2017, 154 pages.
PCT International Search Report and Written Opinion in International Application No. PCT/CN2018/110,878, dated Apr. 1, 2019, 21 pages (With English Translation).
Office Action issued in Chinese Application No. 202010476421.7 dated Apr. 21, 2021, 18 pages (with English translation).
Spreadtrum Communications,"Discussion on search space design," 3GPP TSG RAN WG1 Meeting 90bis, R1-1717748, Prague, Czech Republic, Oct. 9-13, 2017, 4 pages.
Catt, "PDCCH search space design," 3GPP TSG RAN WG1 Meeting AH_#NR3, R1-1715813, Nagoya, Japan, Sep. 18-21, 2017, 10 pages.
Ericsson, "On Search Space and Blind Decoding Design," 3GPP TSG RAN WG1 NR Ad-Hoc#2, R1-1711480, Qingdao, P.R. China, Jun. 27-30, 2017, 4 pages.
Ericsson, "On Search Space and Blind Decoding Design," 3GPP TSG RAN WG1 Meeting#90, R1-1714411, Prague, Czech Republic, Aug. 21-25, 2017, 4 pages.
Office Action issued in Korean Application No. 2020-7013826 dated Nov. 23, 2021, 3 pages (with English translation).
ZTE, "PDCCH Blind decoding and search space on SCC," 3GPP TSG-RAN WG1 #62, R1-104552, Madrid, Spain, Aug. 23-27, 2010, 2 pages.
Office Action issued in Japanese Application No. 2020-521874 dated Feb. 22, 2022, 7 pages (with English translation).

\* cited by examiner

DOWNLINK CONTROL INFORMATION TRANSMISSION METHOD, METHOD FOR OBTAINING QUANTITY OF BLIND DETECTION TIMES, AND APPARATUS

CROSS-REFERENCE TO RELATED APPLICATIONS

This application is a continuation of International Application No. PCT/CN2018/110878, filed on Oct. 18, 2018, which claims priority to Chinese Patent Application No. 201710986659.2, filed on Oct. 20, 2017. The disclosures of the aforementioned applications are hereby incorporated by reference in their entireties.

TECHNICAL FIELD

This application relates to communications technologies, and in particular, to a downlink control information transmission method, a method for obtaining a quantity of blind detection times, and an apparatus.

BACKGROUND

In a conventional long term evolution (LTE) communications system, before receiving or sending data, a terminal device needs to obtain downlink control information configured by a network device for the terminal device. A manner in which the terminal device obtains the downlink control information is performing blind detection in a plurality of candidate locations included in a search space. In the LTE system, the search space usually occupies frequency domain resources corresponding to first several symbols of each subframe, and the terminal device periodically performs blind detection on the first several symbols of each subframe.

Different from the LTE communications system, in a 5th generation new radio access technology (5G NR), the network device usually configures a plurality of independent search spaces for the terminal device. Each search space may have a different period and a different offset. The terminal device performs blind detection based on periods of the configured search spaces. Therefore, a plurality of search spaces may overlap at a same moment, and the terminal device needs to blindly detect at least two search spaces in this case.

However, there is a maximum value of a quantity of blind detection times for the terminal device in a preset time duration. When a quantity of blind detection times allowed by the terminal device in each search space reaches a maximum quantity of blind detection times for the terminal device, at an overlapping moment, a total quantities of blind detection times for the terminal device in all the search spaces exceeds the maximum value that can be allowed by the terminal device. When the quantity of blind detection times allowed by the terminal device in each search space is relatively small, for example, only half or even one third of the maximum quantity of blind detection times for the terminal device is reached, it can be avoided that the total quantities of blind detection times for the terminal device in all the search spaces at the overlapping moment exceeds the maximum value that can be allowed by the terminal device. However, at a non-overlapping moment, a blind detection capability of the terminal device is wasted. A conventional downlink control information transmission method is inappropriate.

SUMMARY

Embodiments of this application provide a downlink control information transmission method, a method for obtaining a quantity of blind detection times, and an apparatus, to resolve a problem that a conventional downlink control information transmission method is inappropriate.

According to a first aspect, an embodiment of this application provides a downlink control information transmission method, applied to a terminal device side, and including:

determining, by a terminal device, that at least two search spaces exist in a preset time duration; and performing, by the terminal device, blind detection in the at least two search spaces based on first information, where the first information is used to indicate the terminal device to perform blind detection in the at least two search spaces, and a total quantities of blind detection times for the terminal device in the at least two search spaces does not exceed a maximum quantity of blind detection times for the terminal device in the preset time duration.

In a possible implementation, any two of the at least two search spaces have different periods or have a same period and a same offset.

In a possible implementation, the first information includes at least one of the following:

length information of downlink control information, preset candidate location information, preset search space information, priority information of at least one of the search spaces, information about a preset aggregation level, or length alignment status information of the downlink control information.

In a possible implementation, the first information includes the length information of the downlink control information, and the performing, by the terminal device, blind detection in the at least two search spaces based on first information includes:

blindly detecting, by the terminal device in the at least two search spaces, the downlink control information of a length indicated by the length information.

In a possible implementation, the length information of the downlink control information is any one of the following:

a smallest length value in lengths of the downlink control information, a largest length value in the lengths of the downlink control information, a length value of downlink control information in a rollback format, or a preset length value of the downlink control information.

In a possible implementation, the first information includes the priority information of the at least one of the search spaces, and the performing, by the terminal device, blind detection in the at least two search spaces based on first information includes:

performing, by the terminal device, blind detection in the at least two search spaces based on the priority information.

In a possible implementation, the performing, by the terminal device, blind detection in the at least two search spaces based on the priority information includes:

sequentially performing, by the terminal device, blind detection in the at least two search spaces based on priorities in descending order until the downlink control information is detected, or the quantity of blind detection times reaches the maximum quantity of blind detection times for the terminal device, or the terminal device completes blind detection in the at least two search spaces.

In a possible implementation, the method further includes:

determining, by the terminal device, the priorities of the search spaces based on at least one of the following: information about types of the search spaces, the periods of the search spaces, subcarrier spacing information of the search spaces, information about symbols occupied by the search spaces, or information about start locations of the search spaces in a slot.

In a possible implementation, the first information includes the length alignment status information of the downlink control information, and the performing, by the terminal device, blind detection in the at least two search spaces based on first information includes:

blindly detecting, by the terminal device when the first information indicates that the length of the downlink control information is aligned, the downlink control information in the at least two search spaces by using the aligned length of the downlink control information.

In a possible implementation, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

In a possible implementation, the method further includes:

receiving, by the terminal device, the first information from a network device.

In a possible implementation, before the performing, by the terminal device, blind detection in the at least two search spaces based on first information, the method further includes:

determining, by the terminal device, that the total quantities of blind detection times corresponding to the at least two search spaces is greater than the maximum quantity of blind detection times for the terminal device.

In a possible implementation, the first information includes the preset candidate location information, and the performing, by the terminal device, blind detection in the at least two search spaces based on first information includes:

performing, by the terminal device, blind detection in a candidate location indicated by the preset candidate location information in the at least two search spaces.

In a possible implementation, the first information includes the preset search space information, and the performing, by the terminal device, blind detection in the at least two search spaces based on first information includes:

performing, by the terminal device, blind detection in a preset search space indicated by the preset search space information in the at least two search spaces.

In a possible implementation, the first information includes the information about the preset aggregation level, and the performing, by the terminal device, blind detection in the at least two search spaces based on first information includes:

blindly detecting, by the terminal device, a candidate location of the preset aggregation level in the at least two search spaces.

According to a second aspect, an embodiment of this application further provides a method for obtaining a quantity of blind detection times, applied to a terminal device side, and including:

receiving, by a terminal device, second information from a network device, where the second information includes search space configuration information; and determining, by the terminal device based on the search space configuration information, a maximum quantity of blind detection times for the terminal device in a search space indicated by the search space configuration information.

In a possible implementation, the search space configuration information includes at least one of the following:

subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

In a possible implementation, the determining, by the terminal device based on the search space configuration information, a maximum quantity of blind detection times for the terminal device in a search space indicated by the search space configuration information includes:

determining, by the terminal device based on the search space configuration information and multi-antenna configuration information of the terminal device, the maximum quantity of blind detection times for the terminal device in the search space indicated by the search space configuration information, where the multi-antenna configuration information includes at least one of the following: a quantity of antennas, a quantity of codewords, and a quantity of layers.

In a possible implementation, the determining, by the terminal device based on the search space configuration information, a maximum quantity of blind detection times for the terminal device in a search space indicated by the search space configuration information includes:

determining, by the terminal device based on a quantity of beams and/or transmission points that the terminal device needs to listen to and the search space configuration information, a maximum quantity of blind detection times for the terminal device on each beam and/or transmission point.

In a possible implementation, the determining, by the terminal device based on the search space configuration information, a maximum quantity of blind detection times for the terminal device in a search space indicated by the search space configuration information includes:

determining, by the terminal device based on information about a quantity of aggregated carriers and the search space configuration information, a maximum quantity of blind detection times for the terminal device in a search space on each carrier.

In a possible implementation, before the receiving, by a terminal device, second information from a network device, the method further includes:

sending, by the terminal device to the network device, a maximum quantity of blind detection times that can be supported by the terminal device.

According to a third aspect, an embodiment of this application further provides a downlink control information transmission method, applied to a network device side, and including:

determining, by a network device, to-be-sent downlink control information; and sending, by the network device based on first information, the downlink control information in at least two search spaces in a preset time duration, where the first information is used to indicate a terminal device to receive the downlink control information in the at least two search spaces.

In a possible implementation, any two of the at least two search spaces have different periods or have a same period and a same offset.

In a possible implementation, the first information includes at least one of the following:

length information of the downlink control information, preset candidate location information, preset search space information, priority information of at least one of the search spaces, information about a preset aggregation level, or length alignment status information of the downlink control information.

In a possible implementation, the first information includes the length information of the downlink control information, and the sending, by the network device based on first information, the downlink control information in at least two search spaces includes:

sending, by the network device in the at least two search spaces, the downlink control information of a length indicated by the length information.

In a possible implementation, the length information of the downlink control information is any one of the following:

a smallest length value in lengths of the downlink control information, a largest length value in the lengths of the downlink control information, a length value of downlink control information in a rollback format, or a preset length value of the downlink control information.

In a possible implementation, the first information includes the priority information of the at least one of the search spaces, and the sending, by the network device based on first information, the downlink control information in at least two search spaces includes:

sending, by the network device based on the priority information, the downlink control information in the at least two search spaces.

In a possible implementation, the method further includes:

determining, by the network device, the priorities of the search spaces based on at least one of the following: information about types of the search spaces, the periods of the search spaces, subcarrier spacing information of the search spaces, information about symbols occupied by the search spaces, or information about start locations of the search spaces in a slot.

In a possible implementation, the first information includes the length alignment status information of the downlink control information, and the sending, by the network device based on first information, the downlink control information in at least two search spaces includes:

sending, by the network device when the first information indicates that the length of the downlink control information is aligned, the aligned downlink control information in the at least two search spaces.

In a possible implementation, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

In a possible implementation, the method further includes:

sending, by the network device, the first information to the terminal device.

In a possible implementation, before the sending, by the network device based on first information, the downlink control information in at least two search spaces, the method further includes:

determining, by the network device, that a total maximum quantities of blind detection times that needs to be performed by the terminal device in the at least two search spaces is greater than a maximum quantity of blind detection times for the terminal device.

In a possible implementation, the first information includes the preset candidate location information, and the sending, by the network device based on first information, the downlink control information in at least two search spaces includes:

sending, by the network device, the downlink control information in a candidate location indicated by the preset candidate location information in the at least two search spaces.

In a possible implementation, the first information includes the preset search space information, and the sending, by the network device based on first information, the downlink control information in at least two search spaces includes:

sending, by the network device, the downlink control information in a preset search space indicated by the preset search space information in the at least two search spaces.

In a possible implementation, the first information includes the information about the preset aggregation level, and the sending, by the network device based on first information, the downlink control information in at least two search spaces includes:

sending, by the network device, the downlink control information in a candidate location of the preset aggregation level in the at least two search spaces.

According to a fourth aspect, an embodiment of this application further provides a method for obtaining a quantity of blind detection times, applied to a network device side, and including:

receiving, by a network device, a maximum quantity of blind detection times that is supported by a terminal device and that is from the terminal device; and determining, by the network device based on the maximum quantity of blind detection times and configuration information of a search space configured by the network device for the terminal device, a maximum quantity of blind detection times for the terminal device in the search space.

In a possible implementation, the search space configuration information includes at least one of the following:

subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

In a possible implementation, the determining, by the network device based on the maximum quantity of blind detection times and configuration information of a search space configured by the network device for the terminal device, a maximum quantity of blind detection times for the terminal device in the search space includes:

determining, by the network device based on the maximum quantity of blind detection times, the configuration information, and multi-antenna configuration information of the terminal device, the maximum quantity of blind detection times for the terminal device in the search space, where the multi-antenna configuration information includes at least one of the following: a quantity of antennas, a quantity of codewords, and a quantity of layers.

In a possible implementation, the determining, by the network device based on the maximum quantity of blind detection times and configuration information of a search space configured by the network device for the terminal device, a maximum quantity of blind detection times for the terminal device in the search space includes:

determining, by the network device based on the maximum quantity of blind detection times, a quantity of beams and/or transmission points that the terminal device needs to listen to and the configuration information, a maximum quantity of blind detection times for the terminal device on each beam and/or transmission point.

In a possible implementation, the determining, by the network device based on the maximum quantity of blind detection times and configuration information of a search space configured by the network device for the terminal device, a maximum quantity of blind detection times for the terminal device in the search space includes:

determining, by the network device based on the maximum quantity of blind detection times, information about a quantity of aggregated carriers and the configuration information, a maximum quantity of blind detection times for the terminal device in a search space on each carrier.

According to a fifth aspect, an embodiment of this application further provides a downlink control information transmission apparatus, used as a terminal device, configured to perform the downlink control information transmission method in the first aspect, and having a same or similar technical feature and technical effect. The apparatus includes:

a search space detection module, configured to determine that at least two search spaces exist in a preset time duration; and
a blind detection module, configured to: perform blind detection in the at least two search spaces based on first information, where the first information is used to indicate the apparatus to perform blind detection in the at least two search spaces, and a total quantities of blind detection times for the apparatus in the at least two search spaces does not exceed a maximum quantity of blind detection times for the apparatus in the preset time duration.

In a possible implementation, any two of the at least two search spaces have different periods or have a same period and a same offset.

In a possible implementation, the first information includes at least one of the following:
length information of downlink control information, preset candidate location information, preset search space information, priority information of at least one of the search spaces, information about a preset aggregation level, or length alignment status information of the downlink control information.

In a possible implementation, the first information includes the length information of the downlink control information, and the blind detection module is specifically configured to blindly detect, in the at least two search spaces, the downlink control information of a length indicated by the length information.

In a possible implementation, the length information of the downlink control information is any one of the following:

a smallest length value in lengths of the downlink control information, a largest length value in the lengths of the downlink control information, a length value of downlink control information in a rollback format, or a preset length value of the downlink control information.

In a possible implementation, the first information includes the priority information of the at least one of the search spaces, and the blind detection module is specifically configured to: perform blind detection in the at least two search spaces based on the priority information.

In a possible implementation, the blind detection module is specifically configured to: sequentially perform blind detection in the at least two search spaces based on priorities in descending order until the downlink control information is detected, or the quantity of blind detection times reaches the maximum quantity of blind detection times for the apparatus, or the apparatus completes blind detection in the at least two search spaces.

In a possible implementation, the apparatus further includes a priority obtaining module, and the priority obtaining module is configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

In a possible implementation, the first information includes the length alignment status information of the downlink control information, and the blind detection module is specifically configured to: blindly detect, when the first information indicates that the length of the downlink control information is aligned, the downlink control information in the at least two search spaces by using the aligned length of the downlink control information.

In a possible implementation, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

In a possible implementation, the apparatus further includes a receiving module, configured to receive first information from a network device.

In a possible implementation, the blind detection module is further configured to determine that the total quantities of blind detection times corresponding to the at least two search spaces is greater than the maximum quantity of blind detection times for the apparatus.

In a possible implementation, the first information includes the preset candidate location information, and the blind detection module is specifically configured to perform blind detection in a candidate location indicated by the preset candidate location information in the at least two search spaces.

In a possible implementation, the first information includes the preset search space information, and the blind detection module is specifically configured to perform blind detection in a preset search space indicated by the preset search space information in the at least two search spaces.

In a possible implementation, the first information includes the information about the preset aggregation level, and the blind detection module is specifically configured to blindly detect a candidate location of the preset aggregation level in the at least two search spaces.

According to a sixth aspect, an embodiment of this application further provides an apparatus for obtaining a quantity of blind detection times, used as a terminal device, configured to perform the method for obtaining a quantity of blind detection times in the second aspect, and having a same or similar technical feature and technical effect. The apparatus includes:
 a receiving module, configured to receive second information from a network device, where the second information includes search space configuration information; and
 a blind detection times obtaining module, configured to determine, based on the search space configuration information, a maximum quantity of blind detection times for the apparatus in a search space indicated by the search space configuration information.

In a possible implementation, the search space configuration information includes at least one of the following:
 subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

In a possible implementation, the blind detection times obtaining module is specifically configured to: determine, based on the search space configuration information and multi-antenna configuration information of the apparatus, the maximum quantity of blind detection times for the apparatus in the search space indicated by the search space configuration information, where the multi-antenna configuration information includes at least one of the following: a quantity of antennas, a quantity of codewords, and a quantity of layers.

In a possible implementation, the blind detection times obtaining module is specifically configured to: determine, based on a quantity of beams and/or transmission points that the apparatus needs to listen to and the search space configuration information, a maximum quantity of blind detection times for the apparatus on each beam and/or transmission point.

In a possible implementation, the blind detection times obtaining module is specifically configured to: determine, based on information about a quantity of aggregated carriers and the search space configuration information, a maximum quantity of blind detection times for the apparatus in a search space on each carrier.

In a possible implementation, the apparatus further includes:
 a sending module, configured to send, to the network device, a maximum quantity of blind detection times that can be supported by the apparatus.

According to a seventh aspect, an embodiment of this application further provides a downlink control information transmission apparatus, used as a network device, configured to perform the downlink control information transmission method in the third aspect, and having a same or similar technical feature and technical effect. The apparatus includes:
 a downlink control information obtaining module, configured to determine to-be-sent downlink control information; and
 a downlink control information sending module, configured to send, based on first information, the downlink control information in at least two search spaces in a preset time duration, where
 the first information is used to indicate a terminal device to receive the downlink control information in the at least two search spaces.

In a possible implementation, any two of the at least two search spaces have different periods or have a same period and a same offset.

In a possible implementation, the first information includes at least one of the following:
 length information of the downlink control information, preset candidate location information, preset search space information, priority information of at least one of the search spaces, information about a preset aggregation level, or length alignment status information of the downlink control information.

In a possible implementation, the first information includes the length information of the downlink control information, and the downlink control information sending module is specifically configured to send, in the at least two search spaces, the downlink control information of a length indicated by the length information.

In a possible implementation, the length information of the downlink control information is any one of the following:
 a smallest length value in lengths of the downlink control information, a largest length value in the lengths of the downlink control information, a length value of downlink control information in a rollback format, or a preset length value of the downlink control information.

In a possible implementation, the first information includes the priority information of the at least one of the search spaces, and the downlink control information sending module is specifically configured to send, based on the priority information, the downlink control information in the at least two search spaces.

In a possible implementation, the apparatus further includes:
 a priority obtaining module, configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

In a possible implementation, the first information includes the length alignment status information of the downlink control information, and the downlink control information sending module is specifically configured to send, when the first information indicates that the length of the downlink control information is aligned, the aligned downlink control information in the at least two search spaces.

In a possible implementation, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

In a possible implementation, the apparatus further includes:
a sending module, configured to send the first information to the terminal device.

In a possible implementation, the downlink control information sending module is further configured to determine that a total maximum quantities of blind detection times that needs to be performed by the terminal device in the at least two search spaces is greater than a maximum quantity of blind detection times for the terminal device.

In a possible implementation, the first information includes the preset candidate location information, and the downlink control information sending module is specifically configured to send the downlink control information in a candidate location indicated by the preset candidate location information in the at least two search spaces.

In a possible implementation, the first information includes the preset search space information, and the downlink control information sending module is specifically configured to send the downlink control information in a preset search space indicated by the preset search space information in the at least two search spaces.

In a possible implementation, the first information includes the information about the preset aggregation level, and the downlink control information sending module is specifically configured to send the downlink control information in a candidate location of the preset aggregation level in the at least two search spaces.

According to an eighth aspect, an embodiment of this application further provides an apparatus for obtaining a quantity of blind detection times, used as a network device, configured to perform the method for obtaining a quantity of blind detection times in the fourth aspect, and having a same or similar technical feature and technical effect. The apparatus includes:
a receiving module, configured to receive a maximum quantity of blind detection times that is supported by a terminal device and that is from the terminal device; and
a maximum-blind-detection-times obtaining module, configured to determine, based on the maximum quantity of blind detection times and configuration information of a search space configured by the apparatus for the terminal device, a maximum quantity of blind detection times for the terminal device in the search space.

In a possible implementation, the search space configuration information includes at least one of the following:
subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

In a possible implementation, the maximum-blind-detection-times obtaining module is specifically configured to determine, based on the maximum quantity of blind detection times, the configuration information, and multi-antenna configuration information of the terminal device, the maximum quantity of blind detection times for the terminal device in the search space, where the multi-antenna configuration information includes at least one of the following: a quantity of antennas, a quantity of codewords, and a quantity of layers.

In a possible implementation, the maximum-blind-detection-times obtaining module is specifically configured to: determine, based on the maximum quantity of blind detection times, a quantity of beams and/or transmission points that the terminal device needs to listen to and the configuration information, a maximum quantity of blind detection times for the terminal device on each beam and/or transmission point.

In a possible implementation, the maximum-blind-detection-times obtaining module is specifically configured to: determine, based on the maximum quantity of blind detection times, information about a quantity of aggregated carriers and the configuration information, a maximum quantity of blind detection times for the terminal device in a search space on each carrier.

According to a ninth aspect, an embodiment of this application further provides a terminal device, configured to perform the downlink control information transmission method in the first aspect, and having a same or similar technical feature and technical effect. The terminal device includes:
a processor, configured to: determine that at least two search spaces exist in a preset time duration; and
perform blind detection in the at least two search spaces based on first information, where the first information is used to indicate the terminal device to perform blind detection in the at least two search spaces, and a total quantities of blind detection times for the terminal device in the at least two search spaces does not exceed a maximum quantity of blind detection times for the terminal device in the preset time duration.

In a possible implementation, any two of the at least two search spaces have different periods or have a same period and a same offset.

In a possible implementation, the first information includes at least one of the following:
length information of downlink control information, preset candidate location information, preset search space information, priority information of at least one of the search spaces, information about a preset aggregation level, or length alignment status information of the downlink control information.

In a possible implementation, the first information includes the length information of the downlink control information, and the processor is specifically configured to blindly detect, in the at least two search spaces, the downlink control information of a length indicated by the length information.

In a possible implementation, the length information of the downlink control information is any one of the following:
a smallest length value in lengths of the downlink control information, a largest length value in the lengths of the downlink control information, a length value of downlink control information in a rollback format, or a preset length value of the downlink control information.

In a possible implementation, the first information includes the priority information of the at least one of the search spaces, and the processor is specifically configured to: perform blind detection in the at least two search spaces based on the priority information.

In a possible implementation, the processor is specifically configured to: sequentially perform blind detection in the at least two search spaces based on priorities in descending order until the downlink control information is detected, or the quantity of blind detection times reaches the maximum quantity of blind detection times for the terminal device, or the terminal device completes blind detection in the at least two search spaces.

In a possible implementation, the processor is further configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

In a possible implementation, the first information includes the length alignment status information of the downlink control information, and the processor is specifically configured to: blindly detect, when the first information indicates that the length of the downlink control information is aligned, the downlink control information in the at least two search spaces by using the aligned length of the downlink control information.

In a possible implementation, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

In a possible implementation, the terminal device further includes a receiver, configured to receive the first information from a network device.

In a possible implementation, the processor is further configured to determine that the total quantities of blind detection times corresponding to the at least two search spaces is greater than the maximum quantity of blind detection times for the terminal device.

In a possible implementation, the first information includes the preset candidate location information, and the processor is specifically configured to perform blind detection in a candidate location indicated by the preset candidate location information in the at least two search spaces.

In a possible implementation, the first information includes the preset search space information, and the processor is specifically configured to perform blind detection in a preset search space indicated by the preset search space information in the at least two search spaces.

In a possible implementation, the first information includes the information about the preset aggregation level, and the processor is specifically configured to blindly detect a candidate location of the preset aggregation level in the at least two search spaces.

According to a tenth aspect, an embodiment of this application further provides a terminal device, configured to perform the method for obtaining a quantity of blind detection times in the second aspect, and having a same or similar technical feature and technical effect. The terminal device includes:
  a receiver, configured to receive second information from a network device, where the second information includes search space configuration information; and
  a processor, configured to determine, based on the search space configuration information, a maximum quantity of blind detection times for the terminal device in a search space indicated by the search space configuration information.

In a possible implementation, the search space configuration information includes at least one of the following:
  subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

In a possible implementation, the processor is specifically configured to: determine, based on the search space configuration information and multi-antenna configuration information of the terminal device, the maximum quantity of blind detection times for the terminal device in the search space indicated by the search space configuration information, where the multi-antenna configuration information includes at least one of the following: a quantity of antennas, a quantity of codewords, and a quantity of layers.

In a possible implementation, the processor is specifically configured to: determine, based on a quantity of beams and/or transmission points that the terminal device needs to listen to and the search space configuration information, a maximum quantity of blind detection times for the terminal device on each beam and/or transmission point.

In a possible implementation, the processor is specifically configured to: determine, based on information about a quantity of aggregated carriers and the search space configuration information, a maximum quantity of blind detection times for the terminal device in a search space on each carrier.

In a possible implementation, the terminal device further includes:
  a transmitter, configured to send, to the network device, a maximum quantity of blind detection times that can be supported by the terminal device.

According to an eleventh aspect, an embodiment of this application further provides a network device, configured to perform the downlink control information transmission method in the third aspect, and having a same or similar technical feature and technical effect. The network device includes:
  a processor, configured to: determine to-be-sent downlink control information; and
  send, based on first information, the downlink control information in at least two search spaces in a preset time duration, where
  the first information is used to indicate a terminal device to receive the downlink control information in the at least two search spaces.

In a possible implementation, any two of the at least two search spaces have different periods or have a same period and a same offset.

In a possible implementation, the first information includes at least one of the following:

length information of the downlink control information, preset candidate location information, preset search space information, priority information of at least one of the search spaces, information about a preset aggregation level, or length alignment status information of the downlink control information.

In a possible implementation, the first information includes the length information of the downlink control information, and the processor is specifically configured to send, in the at least two search spaces, the downlink control information of a length indicated by the length information.

In a possible implementation, the length information of the downlink control information is any one of the following:

a smallest length value in lengths of the downlink control information, a largest length value in the lengths of the downlink control information, a length value of downlink control information in a rollback format, or a preset length value of the downlink control information.

In a possible implementation, the first information includes the priority information of the at least one of the search spaces, and the processor is specifically configured to send, based on the priority information, the downlink control information in the at least two search spaces.

In a possible implementation, the processor is further configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

In a possible implementation, the first information includes the length alignment status information of the downlink control information, and the processor is specifically configured to send, when the first information indicates that the length of the downlink control information is aligned, the aligned downlink control information in the at least two search spaces.

In a possible implementation, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

In a possible implementation, the network device further includes:

a transmitter, configured to send the first information to the terminal device.

In a possible implementation, the processor is further configured to determine that a total maximum quantities of blind detection times that needs to be performed by the terminal device in the at least two search spaces is greater than a maximum quantity of blind detection times for the terminal device.

In a possible implementation, the first information includes the preset candidate location information, and the processor is specifically configured to send the downlink control information in a candidate location indicated by the preset candidate location information in the at least two search spaces.

In a possible implementation, the first information includes the preset search space information, and the processor is specifically configured to send the downlink control information in a preset search space indicated by the preset search space information in the at least two search spaces.

In a possible implementation, the first information includes the information about the preset aggregation level, and the processor is specifically configured to send the downlink control information in a candidate location of the preset aggregation level in the at least two search spaces.

According to a twelfth aspect, an embodiment of this application further provides a network device, configured to perform the method for obtaining a quantity of blind detection times in the fourth aspect, and having a same or similar technical feature and technical effect. The network device includes:

a receiver, configured to receive a maximum quantity of blind detection times that is supported by a terminal device and that is from the terminal device; and a processor, configured to determine, based on the maximum quantity of blind detection times and configuration information of a search space configured by the network device for the terminal device, a maximum quantity of blind detection times for the terminal device in the search space.

In a possible implementation, the search space configuration information includes at least one of the following:

subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

In a possible implementation, the processor is specifically configured to determine, based on the maximum quantity of blind detection times, the configuration information, and multi-antenna configuration information of the terminal device, the maximum quantity of blind detection times for the terminal device in the search space, where the multi-antenna configuration information includes at least one of the following: a quantity of antennas, a quantity of codewords, and a quantity of layers.

In a possible implementation, the processor is specifically configured to: determine, based on the maximum quantity of blind detection times, a quantity of beams and/or transmission points that the terminal device needs to listen to and the configuration information, a maximum quantity of blind detection times for the terminal device on each beam and/or transmission point.

In a possible implementation, the processor is specifically configured to: determine, based on the maximum quantity of blind detection times, information about a quantity of aggregated carriers and the configuration information, a maximum quantity of blind detection times for the terminal device in a search space on each carrier.

According to a thirteenth aspect, an embodiment of this application further provides a program. The program is configured to perform, when executed by a processor, the downlink control information transmission method corresponding to the terminal device side in the first aspect.

According to a fourteenth aspect, an embodiment of this application further provides a program product, such as a computer-readable storage medium, including the program according to the thirteenth aspect.

According to a fifteenth aspect, an embodiment of this application further provides a computer-readable storage medium. The computer-readable storage medium stores an instruction. When the instruction is run on a computer, the computer is enabled to perform the downlink control information transmission method corresponding to the terminal device side in the first aspect.

According to a sixteenth aspect, an embodiment of this application further provides a program. The program is configured to perform, when executed by a processor, the method for obtaining a quantity of blind detection times corresponding to the terminal device side in the second aspect.

According to a seventeenth aspect, an embodiment of this application further provides a program product, such as a computer-readable storage medium, including the program according to the sixteenth aspect.

According to an eighteenth aspect, an embodiment of this application further provides a computer-readable storage medium. The computer-readable storage medium stores an instruction. When the instruction is run on a computer, the computer is enabled to perform the method for obtaining a quantity of blind detection times corresponding to the terminal device side in the second aspect.

According to a nineteenth aspect, an embodiment of this application further provides a program. The program is configured to perform, when executed by a processor, the downlink control information transmission method corresponding to the network device side in the third aspect.

According to a twentieth aspect, an embodiment of this application further provides a program product, such as a computer-readable storage medium, including the program according to the nineteenth aspect.

According to a twenty-first aspect, an embodiment of this application further provides a computer-readable storage medium. The computer-readable storage medium stores an instruction. When the instruction is run on a computer, the computer is enabled to perform the downlink control information transmission method corresponding to the network device side in the third aspect.

According to a twenty-second aspect, an embodiment of this application further provides a program. The program is configured to perform, when executed by a processor, the method for obtaining a quantity of blind detection times corresponding to the network device side in the fourth aspect.

According to a twenty-third aspect, an embodiment of this application further provides a program product, such as a computer-readable storage medium, including the program according to the twenty-second aspect.

According to a twenty-fourth aspect, an embodiment of this application further provides a computer-readable storage medium. The computer-readable storage medium stores an instruction. When the instruction is run on a computer, the computer is enabled to perform the method for obtaining a quantity of blind detection times corresponding to the network device side in the fourth aspect.

DESCRIPTION OF EMBODIMENTS

Figure 1:
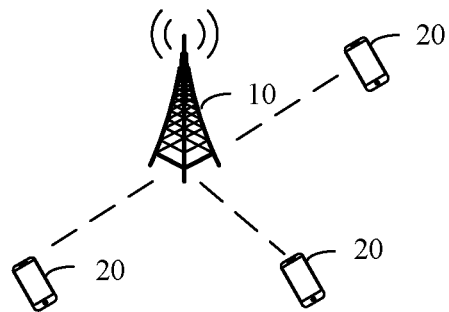
FIG. 1 is a schematic diagram of Embodiment 1 of a network architecture to which an embodiment of this application is applicable.

FIG. 1 is a schematic diagram of Embodiment 1 of a network architecture to which an embodiment of this application is applicable. As shown in FIG. 1, the network architecture provided in this embodiment includes a network device 10 and at least one terminal device 20.

The network device 10 is a device that connects the terminal device 20 to a wireless network, and may be a base transceiver station (BTS for short) in a global system for mobile communications (GSM for short) or code division multiple access (CDMA for short), may be a NodeB (NB for short) in wideband code division multiple access (WCDMA for short), or may be an evolved NodeB (eNB or eNodeB for short) in long term evolution (LTE for short), a relay station, an access point, a base station in a future 5th generation mobile communications (5G) network, or a relay station, an access point, a vehicle-mounted device, a wearable device, and the like that operate in a high frequency band. This is not limited in this application. FIG. 1 schematically shows a possible example in which the network device 10 is a base station.

The terminal device 20 may be a wireless terminal or a wired terminal. The wireless terminal may be a device that provides a user with voice and/or other service data connectivity, a handheld device with a radio connection function, or another processing device connected to a radio modem. The wireless terminal may communicate with one or more core networks through a radio access network (RAN for short). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS for short) phone, a cordless telephone set, a session initiation protocol (SIP for short) phone, a wireless local loop (WLL for short) station, or a personal digital assistant (PDA for short). The wireless terminal may also be referred to as a system, a subscriber unit, a subscriber station, a mobile station, a remote station, a remote terminal, an access terminal, a user terminal, a user agent. This application is not limited thereto. FIG. 1 schematically shows a possible schematic diagram of an example in which the terminal device 20 is a mobile phone.

In a conventional LTE system, before receiving or sending data information, the terminal device 20 needs to learn of downlink control information (DCI) configured by the network device 10 for the terminal device 20. The DCI is used to indicate to the terminal device how to receive downlink data and transmit uplink data. For example, the DCI may include information such as a resource, a modulation and coding scheme, a bit rate, and a redundancy version that are used when the terminal device performs uplink and downlink data transmission. When sending the DCI, the network device 10 usually adds the DCI to a physical downlink control channel (PDCCH) in a search space for transmission. The following describes in detail basic concepts related to DCI transmission.

Figure 2:
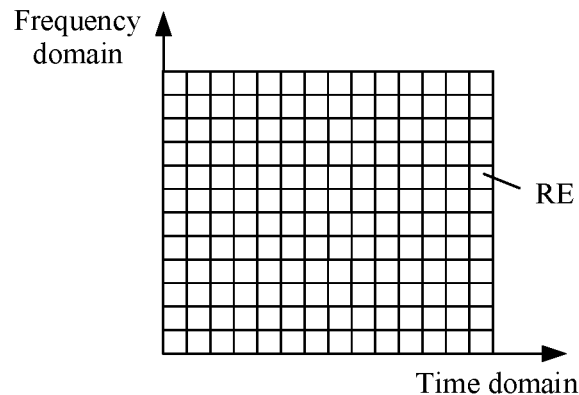
FIG. 2 is a schematic structural diagram of a time-frequency resource in a communications system.

A time-frequency resource in an LTE system is divided into a plurality of radio frames of 10 ms in time domain. One radio frame includes 10 subframes of 1 ms, each subframe includes two slots, and a quantity of symbols included in each slot is related to a length of a cyclic prefix (CP) in a subframe. If the CP is a normal CP, each slot includes seven symbols, and each subframe includes 14 symbols. For example, each subframe includes symbols whose sequence numbers are respectively #0, #1, #2, #3, #4, #5, #6, #7, #8, #9, #10, #11, #12, and #13. If the CP is an extended CP, each slot includes six symbols, and each subframe includes 12 symbols. For example, each subframe includes symbols whose sequence numbers are respectively #0, #1, #2, #3, #4, #5, #6, #7, #8, #9, #10, and #11. A smallest unit of the time-frequency resource in frequency domain is a subcarrier. A resource element (RE) is a smallest unit for dividing the time-frequency resource, and is uniquely identified by an index pair (k, l). k is a subcarrier index, and l is a symbol index. Certainly, the resource element may alternatively be identified by using an identifier in another form. Four consecutive REs belonging to a same symbol form a resource element group (REG). A granularity for frequency-domain scheduling is a resource block group (RBG), and one RGB includes a plurality of resource block (RB) pairs. One RB pair is a two-dimensional resource block of one subframe in time domain and 12 subcarriers in frequency domain. For the normal CP, one RB pair includes 168 time-frequency resource elements REs; for the extended CP, one RB pair includes 144 time-frequency resource elements REs. FIG. 2 is a schematic structural diagram of a time-frequency resource in a communications system. FIG. 2 shows two RBs (one PRB pair) of the normal CP. A control channel element (CCE) is a smallest unit when the PDCCH occupies the time-frequency resource. One PDCCH occupies at least one CCE. One CCE includes nine REGs, that is, 36 REs. The REGs forming the CCE may be consecutively or inconsecutively distributed.

A time-frequency resource in a 5G NR system is divided into a plurality of radio frames of 10 ms in time domain, one radio frame includes 10 subframes of 1 ms, and each subframe includes several slots. For a subcarrier spacing of 15 kHz, one subframe includes one slot; for a subcarrier spacing of 30 kHz, one subframe includes two slots. A quantity of symbols included in each slot is related to a length of a cyclic prefix (CP) in a subframe. Using the subcarrier spacing of 15 kHz as an example, if the CP is a normal CP, each slot includes 14 symbols, for example, includes symbols whose sequence numbers are respectively #0, #1, #2, #3, #4, #5, #6, #7, #8, #9, #10, #11, #12, and #13. If the CP is an extended CP, each slot includes 12 symbols, for example, includes symbols whose sequence numbers are respectively #0, #1, #2, #3, #4, #5, #6, #7, #8, #9, #10, and #11. A smallest unit of the time-frequency resource in frequency domain is a subcarrier. A resource element (RE) is a smallest unit for dividing the time-frequency resource, and is uniquely identified by an index pair (k, l). k is a subcarrier index, and l is a symbol index. Certainly, the resource element may alternatively be identified by using an identifier in another form. 12 consecutive REs belonging to a same symbol form a resource element group (REG). A granularity for frequency-domain scheduling is a resource block group (RBG), and one RGB includes a plurality of resource blocks (RB). A control channel element (CCE) is a smallest unit when the PDCCH occupies the time-frequency resource. One PDCCH occupies at least one CCE. One CCE includes six REGs, that is, 72 REs. The REGs forming the CCE may be consecutively or inconsecutively distributed.

In the LTE system, a common search space includes 16 CCEs, and it is agreed that an aggregation level (AL) of a CCE in the common search space is only 4 or 8. The aggregation level is used to indicate a quantity of CCEs used as a unit in the common search space to carry information, in other words, a quantity of CCEs occupied by one PDCCH. For example, when the AL is set to 8, one PDCCH includes eight CCEs, one common search space may include two PDCCHs, and the two PDCCHs respectively occupy CCEs numbered 0 to 7 and CCEs numbered 8 to 15. When retrieving the common search space, the terminal device 20 is unclear about the AL of the common search space. Therefore, the terminal device 20 needs to perform retrieval in the common search space in units of four and eight CCEs separately. Assuming that AL=8, cyclic redundancy check (CRC) check needs to be performed twice only, on the CCEs numbered 0 to 7 and the CCEs numbered 8 to 15. Assuming that AL=4, CRC check needs to be performed for four times only, on the CCEs numbered 0 to 3, the CCEs numbered 4 to 7, the CCEs numbered 8 to 11, and the CCEs numbered 12 to 15. This process may be referred to as a blind detection process of the terminal device 20. The terminal device 20 only needs to perform CRC check for a maximum of six times to complete retrieval of the common search space.

An aggregation level of a specific search space may be any one of 1, 2, 4, or 8, and a total quantity of CCEs of the corresponding specific search space is respectively 6, 12, 8, or 16. It can be learned with reference to calculation of a blind detection workload in the common search space that, the terminal device 20 needs to perform blind detection for a maximum of (6/1+12/2+8/4+16/8)=16 times to obtain DCI information carried in the specific search space. One specific search space may also include at least one PDCCH. A quantity of CCEs occupied by one PDCCH depends on an aggregation level.

Because the DCI information may be carried in the common search space or may be carried in the specific search space, in the LTE system, the terminal device needs to perform blind detection for a maximum of 22 times when blindly detecting DCI of one length. When the length of the DCI that needs to be blindly detected by the terminal device has two possibilities, the terminal device needs to perform blind detection for a maximum of 44 times. A search space in the LTE system is usually located in first three symbols of each subframe. The terminal device performs blind detection on the first three symbols of each subframe for a quantity of times that does not exceed 44.

However, in a 5G system, unlike the LTE communications system, single-carrier bandwidth may reach 400 MHz. If the downlink control channel PDCCH occupies all bandwidth as in LTE, UE needs to perform blind detection on all the bandwidth. As a result, complexity is multiplied, and power consumption is large. Therefore, the network device usually configures a plurality of independent search spaces/control resource sets (COntrol REsource SET, CORESET) for the terminal device. The CORESET is a set of time-frequency resources used to carry control information, is one to three symbols in time domain, and is a part of bandwidth in frequency domain. The search space is a space formed by a logical location that is calculated in the control resource set CORESET according to a hash function. In the 5G NR system, search spaces are also classified into two types: a common search space and a specific search space of the terminal device. The aggregation level may be 16 or 32 in addition to the 1, 2, 4, and 8. The terminal device performs blind detection based on periods of the configured search spaces. Therefore, a plurality of search spaces may overlap at a same moment, and the terminal device needs to blindly detect at least two search spaces in this case.

However, there is a maximum value of a quantity of blind detection times for the terminal device in a preset time duration. When a quantity of blind detection times allowed by the terminal device in each search space reaches a maximum quantity of blind detection times for the terminal device, at an overlapping moment, a total quantities of blind detection times for the terminal device in all the search spaces exceeds the maximum value that can be allowed by the terminal device. When the quantity of blind detection times allowed by the terminal device in each search space is relatively small, for example, only half or even one third of the maximum quantity of blind detection times for the terminal device is reached, it can be avoided that the total quantities of blind detection times for the terminal device in all the search spaces at the overlapping moment exceeds the maximum value that can be allowed by the terminal device. However, at a non-overlapping moment, a blind detection capability of the terminal device is wasted. A conventional downlink control information transmission method is inappropriate.

To resolve the foregoing problem, the embodiments of this application provide a downlink control information blind transmission method and apparatus. With reference to specific embodiments, the following describes in detail the downlink control information blind transmission method and apparatus provided in the embodiments of this application. In the following several specific embodiments, same or similar concepts or processes may not be described repeatedly in some embodiments.

Figure 3:
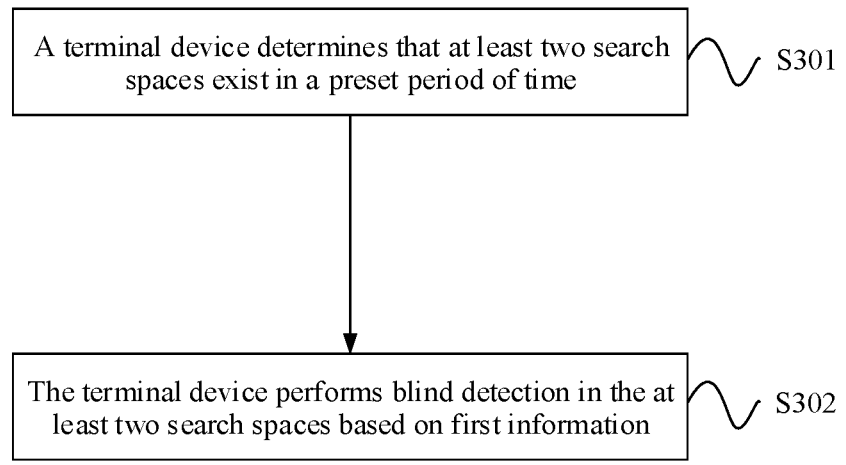
FIG. 3 is a schematic flowchart of a downlink control information transmission method according to Embodiment 1 of this application.

One aspect of the embodiments of this application provides a downlink control information transmission method. FIG. 3 is a schematic flowchart of a downlink control information transmission method according to Embodiment 1 of this application. In this embodiment, a terminal device performs blind detection in search spaces based on first information, thereby ensuring that a quantity of blind detection times for the terminal device does not exceed a maximum quantity of blind detection times for the terminal device at an overlapping moment. As shown in FIG. 3, the downlink control information transmission method includes the following steps.

S301. The terminal device determines that at least two search spaces exist in a preset time duration.

For example, the terminal device determines a quantity of search spaces in the preset time duration based on received information about a search space configured by a network device. Optionally, the preset time duration may be one or more slots, or may be one mini slot, or may be one or more symbols, or may be a fixed time duration such as 1 ms, or may be one or more subframes. The preset time duration is an overlapping moment of period points of the at least two search spaces. A quantity of symbols included in the mini slot is less than 7. For example, a maximum value that can be reached by the quantity of blind detection times performed by the terminal device in the preset time duration is referred to as a maximum quantity of blind detection times for the terminal device. A quantity of blind detection times for the terminal device in each search space is set to the maximum quantity of blind detection times. Therefore, the terminal device needs to determine a quantity of search spaces in the preset time duration. When only one search space exists in the preset time duration, the quantity of blind detection times that needs to be performed by the terminal device does not exceed the maximum quantity of blind detection times for the terminal device, thereby ensuring that a blind detection capability of the terminal device is not wasted.

S302. The terminal device performs blind detection in the at least two search spaces based on first information.

The first information is used to indicate the terminal device to perform blind detection in the at least two search spaces, and a total quantities of blind detection times for the terminal device in the at least two search spaces does not exceed a maximum quantity of blind detection times for the terminal device in the preset time duration.

For example, when the terminal device determines that at least two search spaces exist in the preset time duration, a case in which a quantity of blind detection times that actually needs to be performed by the terminal device exceeds the maximum quantity of blind detection times for the terminal device may exist in the time duration. To avoid this case, the terminal device performs blind detection in the at least two search spaces based on the first information, so that the total quantities of blind detection times for the terminal device in the at least two search spaces does not exceed the maximum quantity of blind detection times for the terminal device. For example, the first information may be used to indicate the terminal device to evenly allocate the maximum quantity of blind detection times to the search spaces. For example, when the maximum quantity of blind detection times for the terminal device in the preset time duration is 44, and two search spaces exist in the preset time duration, a maximum quantity of blind detection times for the terminal device in each of the two search spaces may be set to 22. In this way, when only one search space exists in the preset time duration, the quantity of blind detection times for the terminal device in the search space may reach the maximum quantity of blind detection times. When a plurality of search spaces exist in the preset time duration, a total quantities of blind detection times that can be allowed by the terminal device in all the search spaces does not exceed the maximum quantity of blind detection times for the terminal device. In this case, the terminal device may simultaneously perform blind detection in a plurality of search spaces. Optionally, the first information may be further used to indicate the terminal device to perform blind detection in different search spaces according to a priority sequence. In other words, the maximum quantity of blind detection times is preferentially used by one of the search spaces; if no DCI is detected after search of the search space is completed, and there is still a remaining quantity of blind detection times, blind detection is performed in search spaces with secondary priorities within a range of the remaining quantity of blind detection times. Optionally, the first information may be further used to indicate the terminal device to perform blind detection in the search spaces in another manner.

The downlink control information transmission method provided in this embodiment of this application includes: determining, by the terminal device, that at least two search spaces exist in the preset time duration; and performing, by the terminal device, blind detection in the at least two search spaces based on the first information, where the first information is used to indicate the terminal device to perform blind detection in the at least two search spaces, and the total quantities of blind detection times for the terminal device in the at least two search spaces does not exceed the maximum quantity of blind detection times for the terminal device in the preset time duration. In this embodiment, the terminal device determines a quantity of search spaces in the preset time duration, and performs blind detection based on the first information when the quantity of search spaces is at least two, to ensure that the total quantities of blind detection times for the terminal device in the at least two search spaces does not exceed the maximum quantity of blind detection times for the terminal device in the preset time duration, and also avoid a waste of a blind detection capability of the terminal device.

Further, based on the foregoing embodiment, the terminal device determines that at least two search spaces exist in the preset time duration, and any two of the at least two search spaces have different periods or have a same period and a same offset.

Figure 4:
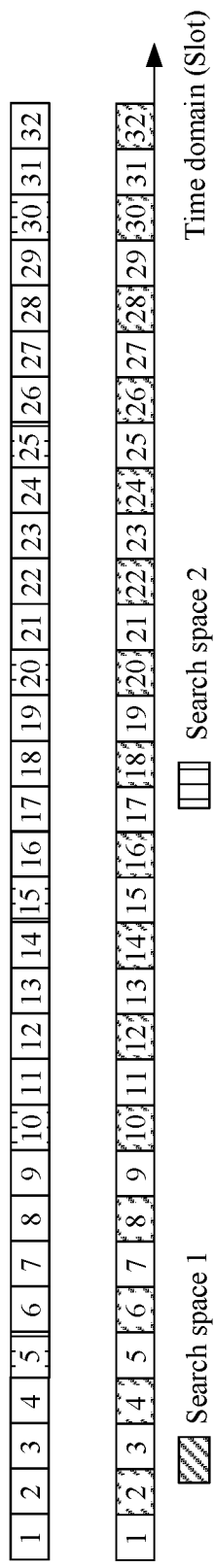
FIG. 4 is a schematic diagram of a period of a search space according to an embodiment of this application.

For example, when the two search spaces have a same period but different offsets, the two search spaces do not appear in a same preset time duration. When the two search spaces have a same period and a same offset, the two search spaces definitely appear in a same preset time duration. However, when the two search spaces have different periods, there is certainly a preset time duration in which the two search spaces simultaneously appear. FIG. 4 is a schematic diagram of a period of a search space according to an embodiment of this application. As shown in FIG. 4, a period of a search space 1 is two slots, and a period of a search space 2 is five slots. Therefore, there is an overlapping slot at an interval of 10 slots, and a terminal device has two search spaces in the slot. As shown in FIG. 4, overlapping slots are slots 10, 20, and 30.

Further, based on the foregoing embodiments, in the downlink control information transmission method, first information includes at least one of the following:
length information of downlink control information, preset candidate location information, preset search space information, priority information of at least one of the search spaces, information about a preset aggregation level, or length alignment status information of the downlink control information.

With reference to specific embodiments, the following describes in detail a specific manner in which the terminal device performs blind detection when the first information includes different content.

In a first feasible implementation, when the first information includes the length information of the downlink control information, correspondingly, the performing, by the terminal device, blind detection in the at least two search spaces based on first information in the foregoing embodiments specifically includes:
blindly detecting, by the terminal device in the at least two search spaces, the downlink control information of a length indicated by the length information.

For example, when at least two search spaces exist, the terminal device blindly detects DCI of only one length during blind detection. DCI of different lengths is from using a same length, thereby reducing a quantity of blind detection times that needs to be performed by the terminal device.

Optionally, the length information of the downlink control information is any one of the following:
a smallest length value in lengths of the downlink control information, a largest length value in the lengths of the downlink control information, a length value of downlink control information in a rollback format, or a preset length value of the downlink control information.

For example, the length information of the downlink control information that is included in the first information may be a length of downlink control information of a smallest length, a length of downlink control information of a largest length, a length of downlink control information in a rollback format, or a preset length of the downlink control information. Using the length of the downlink control information in the rollback format can avoid blurring of the terminal device between an RRC configuration and an RRC reconfiguration. Optionally, the preset length of the downlink control information may be configured by a network device for the terminal device by using radio resource control (RRC) information.

Optionally, the length information of the downlink control information that is included in the first information may be another length.

In a second feasible implementation, when the first information includes the preset candidate location information, correspondingly, the performing, by the terminal device, blind detection in the at least two search spaces based on first information in the foregoing embodiments specifically includes:
performing, by the terminal device, blind detection in a candidate location indicated by the preset candidate location information in the at least two search spaces.

For example, a total quantity of candidate locations included in a search space is directly proportional to a quantity of blind detection times that needs to be performed by the terminal device in the search space. Therefore, the terminal device detects only some preset candidate locations in the search space based on the first information, so that a quantity of blind detection times for the terminal device in the search spaces can be reduced. For example, the preset candidate location may be configured by the network device, may be calculated by the terminal device according to a preset formula, or may be a candidate location specified in a protocol.

In a third feasible implementation, when the first information includes the preset search space information, correspondingly, the performing, by the terminal device, blind detection in the at least two search spaces based on first information in the foregoing embodiments specifically includes:

performing, by the terminal device, blind detection in a preset search space indicated by the preset search space information in the at least two search spaces.

For example, when at least two search spaces exist, the terminal device performs blind detection only in a preset search space, thereby reducing a quantity of blind detection times. For example, there may be one preset search space. When a quantity of search spaces is relatively large in a preset time duration, and a quantity of blind detection times needed by a single search space is relatively small, there may alternatively be more than one preset search space. The preset search space may be configured by the network device, or may be calculated by the terminal device according to a preset formula, or may be a search space defined in a protocol. For example, the preset search space is a common search space. In other words, the terminal performs blind detection only on the common search space at an overlapping moment.

In a fourth feasible implementation, when the first information includes the priority information of the at least one of the search spaces, correspondingly, the performing, by the terminal device, blind detection in the at least two search spaces based on first information in the foregoing embodiments specifically includes:

performing, by the terminal device, blind detection in the at least two search spaces based on the priority information.

For example, when at least two search spaces exist, the terminal device preferentially performs blind detection in some search spaces. When the quantity of blind detection times for the terminal device does not reach the maximum quantity of blind detection times, the terminal device performs blind detection in other search spaces.

Optionally, the first information may include priority information of all the search spaces, or may include only priorities of some search spaces, for example, include only a priority of a search space with a relatively high priority, or include only a priority of a search space with a relatively low priority. Optionally, the priority information may be calculated by the terminal device according to a preset formula.

Optionally, the terminal device sequentially performs blind detection in the at least two search spaces based on priorities in descending order until the downlink control information is detected, or the quantity of blind detection times reaches the maximum quantity of blind detection times for the terminal device, or the terminal device completes blind detection in the at least two search spaces.

For example, when performing blind detection based on the priorities, the terminal device may sequentially perform blind detection in the search spaces based on priorities in descending order. The terminal device stops blind detection when detecting the DCI, or stops blind detection when the quantity of blind detection times performed by the terminal device reaches the maximum quantity of blind detection times for the terminal device, or stops blind detection when the quantity of blind detection times performed by the terminal device does not reach the maximum quantity of blind detection times for the terminal device but the terminal device has completed blind detection in the search spaces.

Optionally, the terminal device determines the priorities of the search spaces based on at least one of the following: information about types of the search spaces, the periods of the search spaces, subcarrier spacing information of the search spaces, information about symbols occupied by the search spaces, or information about start locations of the search spaces in a slot.

For example, the first information may directly carry the priorities of the search spaces. Optionally, the network device may alternatively determine the priorities of the search spaces based on information about types of the search spaces, the periods of the search spaces, subcarrier spacing information of the search spaces, information about symbols occupied by the search spaces, or information about start locations of the search spaces in a slot.

Optionally, the terminal device may alternatively determine the priorities of the search spaces based on an effective time of configuration signaling of the search spaces. For example, when a type of the search space is a common search space, a priority of the search space type may be set to be higher than a priority of a specific search space of the terminal device. Optionally, a priority of a search space that occupies a mini slot may be set to a relatively high priority. Optionally, a priority of a search space with a long period may be set to be higher than a priority of a search space with a short period.

In a fifth feasible implementation, when the first information includes the information about the preset aggregation level, correspondingly, the performing, by the terminal device, blind detection in the at least two search spaces based on first information in the foregoing embodiments specifically includes:

blindly detecting, by the terminal device, a candidate location of the preset aggregation level in the at least two search spaces.

For example, a type of an aggregation level included in the search space is directly proportional to the quantity of blind detection times that needs to be performed by the terminal device in the search space. Therefore, when at least two search spaces exist, the terminal device may further blindly detect only candidate locations of some aggregation levels, thereby reducing the quantity of blind detection times. The preset aggregation level may be configured by the network device, or may be calculated by the terminal device according to a preset formula, or may be an aggregation level defined in a protocol. For example, the preset aggregation level is 8. In other words, a terminal performs blind detection only on a candidate location whose aggregation level is 8 at an overlapping moment.

In a sixth feasible implementation, when the first information includes the length alignment status information of the downlink control information, correspondingly, the performing, by the terminal device, blind detection in the at least two search spaces based on first information in the foregoing embodiments specifically includes:

blindly detecting, by the terminal device when the first information indicates that the length of the downlink control information is aligned, the downlink control information in the at least two search spaces by using the aligned length of the downlink control information.

For example, for DCI of different lengths, when sending the DCI to the terminal device, the network device may adjust the DCI to a same length in a padding manner, so that the terminal device detects only DCI of a same length during blind detection.

Optionally, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

For example, a length of downlink control information of a shorter length may be aligned with a length of downlink control information of a longer length. Optionally, if a length of the rollback format is smaller than that of a configuration format, the rollback format may be padded to the configuration format. If the length of the configuration format is smaller than that of the rollback format, the configuration format may be padded to the rollback format.

Optionally, when determining that only one search space exists in a preset time range, the terminal device does not need to pad DCI of a plurality of lengths, and may still use an original DCI length, to reduce downlink control information overheads.

Further, based on the foregoing embodiments, the downlink control information transmission method further includes:

receiving, by the terminal device, the first information from the network device.

Optionally, the first information may alternatively be information pre-stored in the terminal device.

Figure 5:
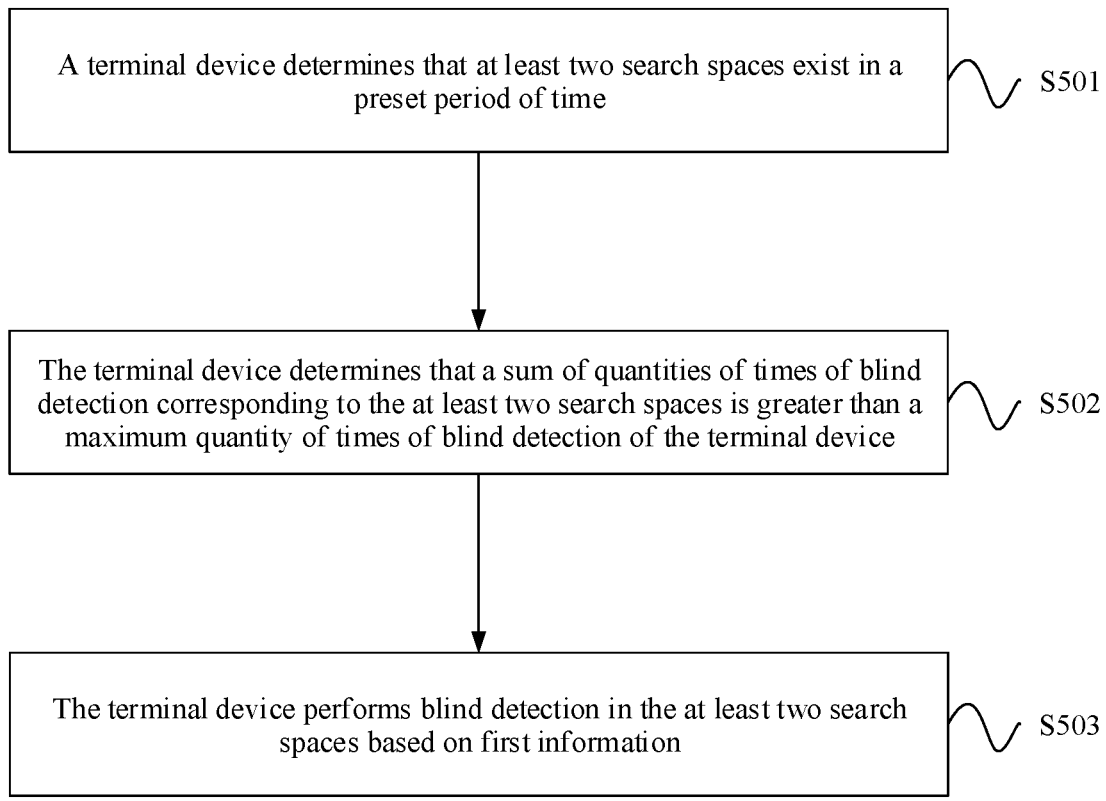
FIG. 5 is a schematic flowchart of a downlink control information transmission method according to Embodiment 2 of this application.

Further, based on the foregoing embodiments, an embodiment of this application further provides a downlink control information transmission method. FIG. 5 is a schematic flowchart of a downlink control information transmission method according to Embodiment 2 of this application. In this embodiment, before performing blind detection, a terminal device needs to first determine that a total quantities of blind detection times corresponding to all search spaces is greater than a maximum quantity of blind detection times for the terminal device. As shown in FIG. 5, the downlink control information transmission method provided in this embodiment of this application includes the following steps.

S501. The terminal device determines that at least two search spaces exist in a preset time duration.

S502. The terminal device determines that a total quantities of blind detection times corresponding to the at least two search spaces is greater than the maximum quantity of blind detection times for the terminal device.

For example, when the terminal device determines that the at least two search spaces exist, the terminal device needs to first determine the total quantities of blind detection times corresponding to the at least two search spaces, and compare the total quantities of blind detection times with the maximum quantity of blind detection times for the terminal device. When the total quantities of blind detection times corresponding to the search spaces is not greater than the maximum quantity of blind detection times for the terminal device, blind detection may be directly performed. When the total quantities of blind detection times corresponding to the search spaces is greater than the maximum quantity of blind detection times for the terminal device, blind detection needs to be performed based on first information.

S503. The terminal device performs blind detection in the at least two search spaces based on the first information.

For example, S501 and S503 in this embodiment are the same as S301 and S302 in the embodiment shown in FIG. 3. Details are not described again in this embodiment.

The downlink control information transmission method provided in this embodiment of this application includes: determining, by the terminal device, that the at least two search spaces exist in the preset time duration; determining, by the terminal device, that the total quantities of blind detection times corresponding to the at least two search spaces is greater than the maximum quantity of blind detection times for the terminal device; and performing, by the terminal device, blind detection in the at least two search spaces based on the first information. In this embodiment, before performing blind detection in the at least two search spaces based on the first information, the terminal device first determines that a total quantities of blind detection times corresponding to search spaces at an overlapping moment is greater than the maximum quantity of blind detection times for the terminal device, thereby preventing blind detection from being still performed based on the first information when the total quantities of blind detection times corresponding to the search spaces is not greater than the maximum quantity of blind detection times for the terminal device, and avoiding a waste of a blind detection capability of the terminal device.

In a 5G NR communications system, to improve a data rate and system performance, and reduce a delay, new technologies such as a mini slot, slot aggregation, a plurality of subcarrier spacings, and a variable DCI length are introduced. These technologies all may cause a quantity of blind detection times that is needed by the terminal device in the preset time duration to change. Therefore, an embodiment of this application further provides a method for obtaining a quantity of blind detection times.

Specifically, in the 5G NR communication system, a carrier aggregation (CA) technology is used as a method for extending system bandwidth, and an enhanced multi-antenna technology (multiple-input multiple-output, Multiple-Input Multiple-Output, MIMO) and a coordinated multi-point technology (CoMP) are used to improve a data rate and system performance. In the carrier aggregation technology, a plurality of carriers are allocated to a same terminal device. In the preset time duration, a quantity of search spaces that need to be blindly detected by the terminal device becomes n times of a quantity of aggregated carriers, where n is a positive integer. Both the MIMO technology and the CoMP technology lead to an increase in the quantity of search spaces. The increase in the quantity of search spaces results in a change in the quantity of blind detection times that needs to be performed by the terminal device in the preset time duration.

Similarly, in 5G NR, a plurality of subcarrier spacings are further introduced. Using 15 kHz as a baseline, a subcarrier spacing may be 15 kHz*$2^n$, n is an integer, and there are a maximum of eight subcarrier spacings: 3.75 kHz, 7.5 kHz, . . . , 480 kHz. Correspondingly, as the subcarrier spacing changes, a plurality of symbol lengths and slot lengths further exist in 5G NR. For example, as the subcarrier spacing increases, a symbol length decreases, so that a length of a common slot becomes shorter because the common slot always includes 14 symbols. One subframe is always 1 millisecond, and a quantity of common slots included in one subframe increases.

Optionally, in 5G NR, a function of a symbol in a slot may include at least one of downlink transmission DL, a guard period (GP), uplink transmission UL, or the like. Therefore, for slots in 5G, the slots may be divided into at least the following: a DL only slot, a DL centric slot, an UL centric slot, an UL only slot, and so on based on different functions of symbols in the slots. Optionally, a quantity of uplink symbols/a quantity of downlink symbols/a quantity of guard period symbols included in different slot compositions are not necessarily the same. Alternatively, slots may have different slot types, and different slot types include different quantities of symbols. For example, a quantity of symbols included in a mini slot is less than 14 (for example, two symbols, four symbols, or seven symbols), and a common slot includes 14 symbols.

Optionally, communications devices in 5G NR usually operate in a high frequency scenario, and fading is severe. To resolve a coverage problem, a slot aggregation technology is introduced into 5G NR. To be specific, a plurality of slots may be allocated to a same terminal device for data transmission, and may be used for uplink data scheduling or downlink data scheduling, and the plurality of slots may alternatively be used for uplink control information (UCI) repetition.

Optionally, in a design for DCI, to support more flexibility in 5G NR, much information is changed into a dynamic indication. However, if excessively much information needs to be carried in the DCI, total overheads of the DCI are excessively large. Therefore, it is considered to configure, for the terminal device by using semi-static RRC signaling, presence/absence of some fields in the DCI, and lengths and a quantity of the fields in the DCI may also be configured by using RRC, thereby improving flexibility and avoiding that the DCI has relatively large fixed overheads. However, in this way, a length of the DCI is relatively flexible, and the quantity of blind detection times that needs to be performed by the terminal device increases.

Figure 6:
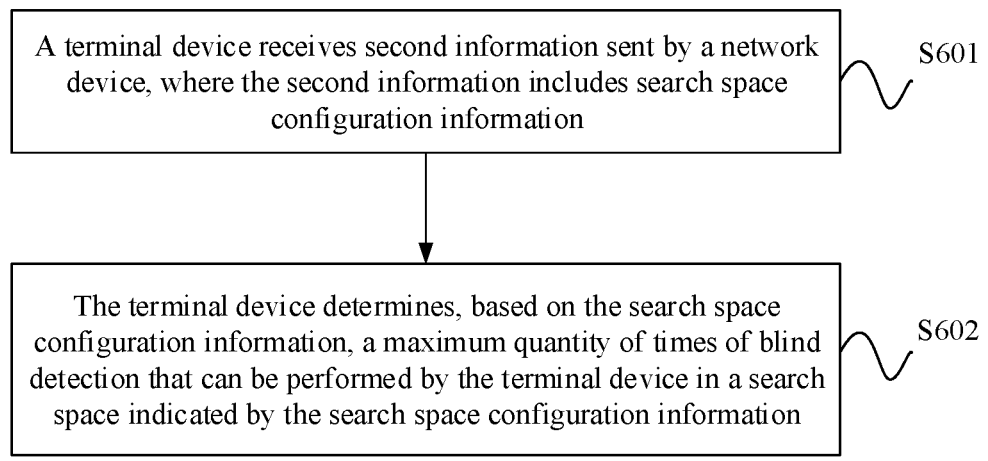
FIG. 6 is a schematic flowchart of a method for obtaining a quantity of blind detection times according to Embodiment 1 of this application.

Therefore, introduction of the foregoing new technologies in 5G may all result in different quantities of blind detection times for the terminal device in the preset time duration. To resolve the foregoing problem, an embodiment of this application provides a method for obtaining a quantity of blind detection times. FIG. 6 is a schematic flowchart of a method for obtaining a quantity of blind detection times according to Embodiment 1 of this application. As shown in FIG. 6, the method for obtaining a quantity of blind detection times includes the following steps.

S601. A terminal device receives second information from a network device, where the second information includes search space configuration information.

For example, when configuring a search space for the terminal device, the network device sends the search space configuration information to the terminal device. The configuration information may be, for example, attribute information of the search space, such as type information of the search space, an aggregation level included in the search space, or other information.

S602. The terminal device determines, based on the search space configuration information, a maximum quantity of blind detection times for the terminal device in a search space indicated by the search space configuration information.

For example, when a new technology is introduced into 5G NR, the search space configuration information is changed. Therefore, the terminal device determines, based on the received search space configuration information, a maximum quantity of blind detection times for the terminal device in the search space.

This embodiment of this application provides the method for obtaining a quantity of blind detection times, including: receiving, by the terminal device, the second information from the network device, where the second information includes the search space configuration information; and determining, by the terminal device based on the search space configuration information, the maximum quantity of blind detection times for the terminal device in the search space indicated by the search space configuration information. In this embodiment, the terminal device determines the maximum quantity of blind detection times for the terminal device based on the search space configuration information, to obtain the accurate maximum quantity of blind detection times for the terminal device.

For example, in the foregoing embodiment, a manner in which the terminal device determines the maximum quantity of blind detection times based on the search space configuration information may include the following several manners:

In a first feasible obtaining manner, the search space configuration information includes at least one of the following: subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

For example, the terminal device determines the maximum quantity of blind detection times based on the subcarrier spacing information. Because a larger subcarrier spacing indicates a smaller symbol length, the quantity of blind detection times for the terminal device decreases as a subcarrier spacing increases. For example, when the subcarrier spacing is 15 kHz, the quantity of blind detection times for the terminal device is 44. Therefore, when the subcarrier spacing increases to 30 kHz, a quantity of blind detection times for the terminal device in a slot may decrease to 22; when the subcarrier spacing increases to 60 kHz, a quantity of blind detection times for the terminal device in a slot may decrease to 11; or when the subcarrier spacing increases to 120 kHz, a quantity of blind detection times for the terminal device in a slot may decrease to 5. Therefore, a total quantities of blind detection times for the terminal device within fixed duration of 1 ms retains 44.

For example, when a slot type is a mini slot, a maximum quantity of blind detection times for the terminal device in the mini slot decreases.

For example, when a slot type includes a mini slot, a maximum quantity of blind detection times for the terminal device in a common slot decreases.

For example, when a slot type includes a mini slot, the terminal device blindly detects only a common search space in a common slot.

For example, when slot aggregation is scheduled, a maximum quantity of blind detection times for the terminal device in a common slot decreases. When slot aggregation is scheduled, a quantity of blind detection times for the terminal device in a mini slot increases.

For example, when a quantity of CORESET symbols in a common slot is relatively small, a maximum quantity of blind detection times for the terminal device in the common slot decreases. When a quantity of CORESET symbols in a common slot is relatively small, a quantity of blind detection times for the terminal device in a mini slot increases.

In a second feasible obtaining manner, the determining, by the terminal device based on the search space configuration information, a maximum quantity of blind detection times for the terminal device in a search space indicated by the search space configuration information includes:

determining, by the terminal device based on the search space configuration information and multi-antenna configuration information of the terminal device, the maximum quantity of blind detection times for the terminal device in the search space indicated by the search space configuration information, where the multi-antenna configuration information includes at least one of the following: a quantity of antennas, a quantity of codewords, and a quantity of layers.

In a third feasible obtaining manner, the determining, by the terminal device based on the search space configuration information, a maximum quantity of blind detection times for the terminal device in a search space indicated by the search space configuration information includes:

determining, by the terminal device based on a quantity of beams and/or transmission points that the terminal device needs to listen to and the search space configuration information, a maximum quantity of blind detection times for the terminal device on each beam and/or transmission point.

For example, when a coordinated multi-point technology is introduced into 5G, the terminal device needs to listen to a plurality of beams or transmission points. For example, the maximum quantity of blind detection times for the terminal device may be the maximum quantity of blind detection times multiplied by a quantity of beams/transmission points. For example, the terminal device may also evenly allocate the maximum quantity of blind detection times to each beam or transmission point.

In a fourth feasible obtaining manner, the determining, by the terminal device based on the search space configuration information, a maximum quantity of blind detection times for the terminal device in a search space indicated by the search space configuration information includes:

determining, by the terminal device based on information about a quantity of aggregated carriers and the search space configuration information, a maximum quantity of blind detection times for the terminal device in a search space on each carrier.

For example, when a carrier aggregation technology is introduced into 5G, the terminal device needs to listen to search spaces on a plurality of carriers. For example, the maximum quantity of blind detection times for the terminal device may be the maximum quantity of blind detection times X a quantity of aggregated carriers. For example, the terminal device may also evenly allocate the maximum quantity of blind detection times to each carrier.

For example, based on any one of the foregoing embodiments, an embodiment of this application further provides a method for obtaining a quantity of blind detection times. In this embodiment, before the terminal device determines the quantity of blind detection times based on the search space configuration information, the method for obtaining a quantity of blind detection times further includes:

sending, by the terminal device to the network device, a maximum quantity of blind detection times that can be supported by the terminal device.

For example, the terminal device may alternatively report a maximum blind detection capability of the terminal device to the network device, to avoid a case in which a total quantity of candidate locations that need to be blindly detected by the terminal device exceeds the maximum quantity of blind detection times for the terminal device.

Another aspect of the embodiments of this application further provides a downlink control information transmission method, applied to a network device side. The method corresponds to the downlink control information transmission method on the terminal device side, and has a same or similar technical feature. Details are not described in this application again.

Figure 7:
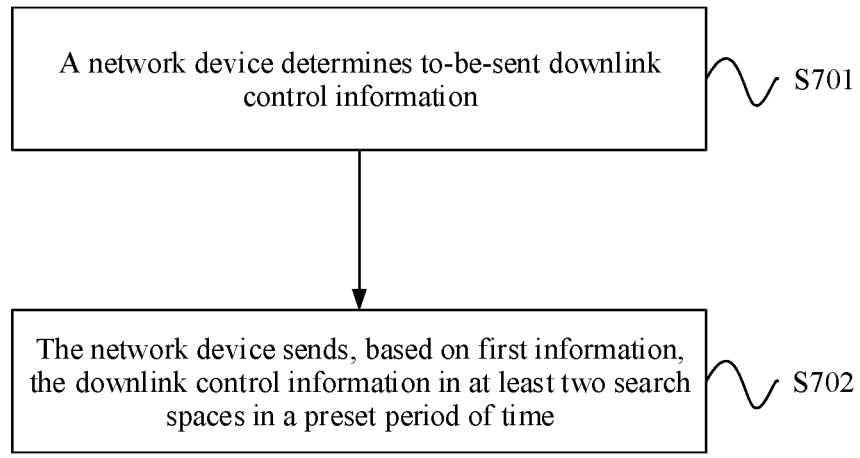
FIG. 7 is a schematic flowchart of a downlink control information transmission method according to Embodiment 3 of this application.

FIG. 7 is a schematic flowchart of a downlink control information transmission method according to Embodiment 3 of this application. As shown in FIG. 7, the downlink control information transmission method includes the following steps.

S701. A network device determines to-be-sent downlink control information.

S702. The network device sends, based on first information, the downlink control information in at least two search spaces in a preset time duration.

The first information is used to indicate a terminal device to receive the downlink control information in the at least two search spaces.

Optionally, any two of the at least two search spaces have different periods or have a same period and a same offset.

Optionally, the first information includes at least one of the following:

length information of the downlink control information, preset candidate location information, preset search space information, priority information of at least one of the search spaces, information about a preset aggregation level, or length alignment status information of the downlink control information.

Optionally, the first information includes the length information of the downlink control information, and the sending, by the network device based on first information, the downlink control information in at least two search spaces includes:

sending, by the network device in the at least two search spaces, the downlink control information of a length indicated by the length information.

Optionally, the length information of the downlink control information is any one of the following:

a smallest length value in lengths of the downlink control information, a largest length value in the lengths of the downlink control information, a length value of downlink control information in a rollback format, or a preset length value of the downlink control information.

Optionally, the first information includes the priority information of the at least one of the search spaces, and the sending, by the network device based on first information, the downlink control information in at least two search spaces includes:

sending, by the network device based on the priority information, the downlink control information in the at least two search spaces.

Optionally, the method further includes:

determining, by the network device, the priorities of the search spaces based on at least one of the following: information about types of the search spaces, the periods of the search spaces, subcarrier spacing information of the search spaces, information about symbols occupied by the search spaces, or information about start locations of the search spaces in a slot.

Optionally, the first information includes the length alignment status information of the downlink control information, and the sending, by the network device based on first information, the downlink control information in at least two search spaces includes:

sending, by the network device when the first information indicates that the length of the downlink control information is aligned, the aligned downlink control information in the at least two search spaces.

Optionally, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

Optionally, the downlink control information transmission method further includes:

sending, by the network device, the first information to the terminal device.

Optionally, before the sending, by the network device based on first information, the downlink control information in at least two search spaces, the method further includes:

determining, by the network device, that a total maximum quantities of blind detection times that needs to be performed by the terminal device in the at least two search spaces is greater than a maximum quantity of blind detection times for the terminal device.

Optionally, the first information includes the preset candidate location information, and the sending, by the network device based on first information, the downlink control information in at least two search spaces includes:

sending, by the network device, the downlink control information in a candidate location indicated by the preset candidate location information in the at least two search spaces.

Optionally, the first information includes the preset search space information, and the sending, by the network device based on first information, the downlink control information in at least two search spaces includes:

sending, by the network device, the downlink control information in a preset search space indicated by the preset search space information in the at least two search spaces.

Optionally, the first information includes the information about the preset aggregation level, and the sending, by the network device based on first information, the downlink control information in at least two search spaces includes:

sending, by the network device, the downlink control information in a candidate location of the preset aggregation level in the at least two search spaces.

Another aspect of the embodiments of this application further provides a method for obtaining a quantity of blind detection times, applied to a network device side. The method corresponds to the method for obtaining a quantity of blind detection times on the terminal device side, and has a same or similar technical feature. Details are not described in this application again.

Figure 8:
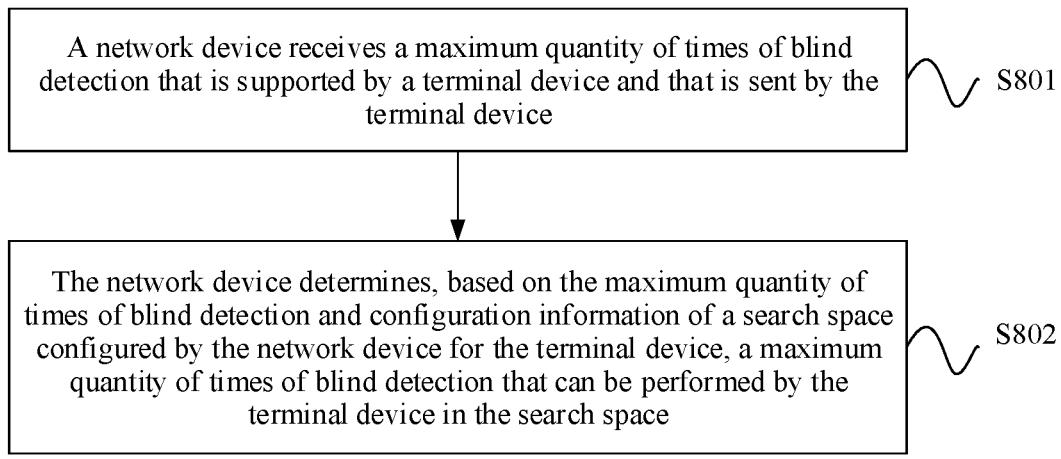
FIG. 8 is a schematic flowchart of a method for obtaining a quantity of blind detection times according to Embodiment 2 of this application.

FIG. 8 is a schematic flowchart of a method for obtaining a quantity of blind detection times according to Embodiment 2 of this application. As shown in FIG. 8, the method for obtaining a quantity of blind detection times includes the following steps.

S801. A network device receives a maximum quantity of blind detection times that is supported by a terminal device and that is from the terminal device.

S802. The network device determines, based on the maximum quantity of blind detection times and configuration information of a search space configured by the network device for the terminal device, a maximum quantity of blind detection times for the terminal device in the search space.

Optionally, the search space configuration information includes at least one of the following:

subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

Optionally, the determining, by the network device based on the maximum quantity of blind detection times and configuration information of a search space configured by the network device for the terminal device, a maximum quantity of blind detection times for the terminal device in the search space includes:

determining, by the network device based on the maximum quantity of blind detection times, the configuration information, and multi-antenna configuration information of the terminal device, the maximum quantity of blind detection times for the terminal device in the search space, where the multi-antenna configuration information includes at least one of the following: a quantity of antennas, a quantity of codewords, and a quantity of layers.

Optionally, the determining, by the network device based on the maximum quantity of blind detection times and configuration information of a search space configured by the network device for the terminal device, a maximum quantity of blind detection times for the terminal device in the search space includes:

determining, by the network device based on the maximum quantity of blind detection times, a quantity of beams and/or transmission points that the terminal device needs to listen to and the configuration information, a maximum quantity of blind detection times for the terminal device on each beam and/or transmission point.

Optionally, the determining, by the network device based on the maximum quantity of blind detection times and configuration information of a search space configured by the network device for the terminal device, a maximum quantity of blind detection times for the terminal device in the search space includes:

determining, by the network device based on the maximum quantity of blind detection times, information about a quantity of aggregated carriers and the configuration information, a maximum quantity of blind detection times for the terminal device in a search space on each carrier.

Another aspect of the embodiments of this application further provides a downlink control information transmission apparatus, configured to perform the downlink control information transmission method on the terminal device side in the foregoing embodiment, and having a same technical feature and technical effect. Details are not described in this application again.

Figure 9:
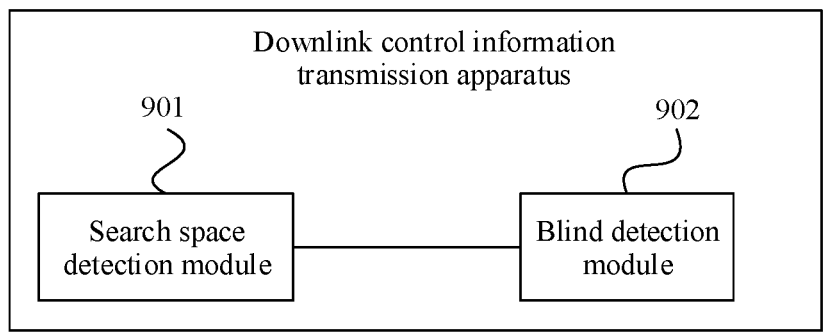
FIG. 9 is a schematic structural diagram of a downlink control information transmission apparatus according to Embodiment 1 of this application.

FIG. 9 is a schematic structural diagram of a downlink control information transmission apparatus according to Embodiment 1 of this application. In this embodiment, the downlink control information transmission apparatus may be implemented by using software, hardware, or a combination of software and hardware. As shown in FIG. 9, the downlink control information transmission apparatus includes:

a search space detection module 901, configured to determine that at least two search spaces exist in a preset time duration; and a blind detection module 902, configured to: perform blind detection in the at least two search spaces based on first information, where the first information is used to indicate the apparatus to perform blind detection in the at least two search spaces, and a total quantities of blind detection times for the apparatus in the at least two search spaces does not exceed a maximum quantity of blind detection times for the apparatus in the preset time duration.

Optionally, any two of the at least two search spaces have different periods or have a same period and a same offset.

Optionally, the first information includes at least one of the following:

length information of downlink control information, preset candidate location information, preset search space information, priority information of at least one of the search spaces, information about a preset aggregation level, or length alignment status information of the downlink control information.

Optionally, the first information includes the length information of the downlink control information, and the blind detection module 902 is specifically configured to blindly detect, in the at least two search spaces, the downlink control information of a length indicated by the length information.

Optionally, the length information of the downlink control information is any one of the following:

a smallest length value in lengths of the downlink control information, a largest length value in the lengths of the downlink control information, a length value of downlink control information in a rollback format, or a preset length value of the downlink control information.

Optionally, the first information includes the priority information of the at least one of the search spaces, and the blind detection module 902 is specifically configured to: perform blind detection in the at least two search spaces based on the priority information.

Optionally, the blind detection module 902 is specifically configured to: sequentially perform blind detection in the at least two search spaces based on priorities in descending order until the downlink control information is detected, or the quantity of blind detection times reaches the maximum quantity of blind detection times for the apparatus, or the apparatus completes blind detection in the at least two search spaces.

Figure 10:
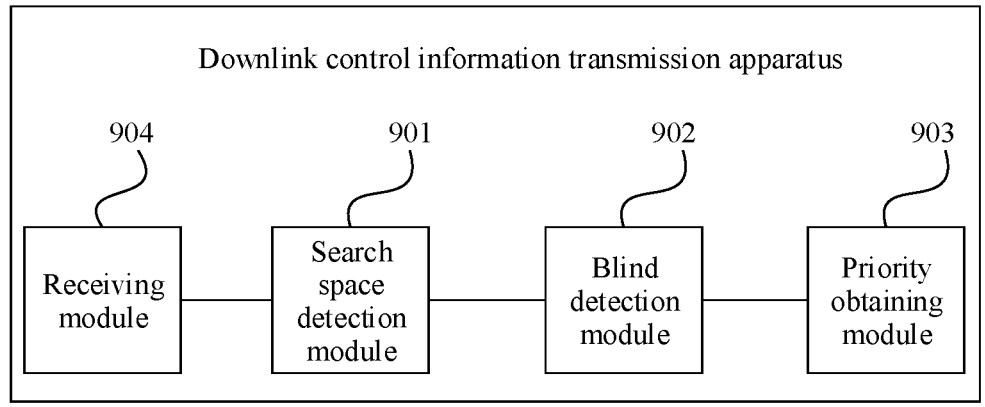
FIG. 10 is a schematic structural diagram of a downlink control information transmission apparatus according to Embodiment 2 of this application.

Further, based on the embodiment shown in FIG. 9, FIG. 10 is a schematic structural diagram of a downlink control information transmission according to Embodiment 2 of this application. As shown in FIG. 10, the downlink control information transmission apparatus further includes:

a priority obtaining module 903, configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

Optionally, the first information includes the length alignment status information of the downlink control information, and the blind detection module 902 is specifically configured to: blindly detect, when the first information indicates that the length of the downlink control information is aligned, the downlink control information in the at least two search spaces by using the aligned length of the downlink control information.

Optionally, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

Further, as shown in FIG. 10, the downlink control information transmission apparatus further includes: a receiving module 904, configured to receive first information from a network device.

Optionally, the blind detection module 902 is further configured to determine that the total quantities of blind detection times corresponding to the at least two search spaces is greater than the maximum quantity of blind detection times for the apparatus.

Optionally, the first information includes the preset candidate location information, and the blind detection module 902 is specifically configured to perform blind detection in a candidate location indicated by the preset candidate location information in the at least two search spaces.

Optionally, the first information includes the preset search space information, and the blind detection module 902 is specifically configured to perform blind detection in a preset search space indicated by the preset search space information in the at least two search spaces.

Optionally, the first information includes the information about the preset aggregation level, and the blind detection module 902 is specifically configured to blindly detect a candidate location of the preset aggregation level in the at least two search spaces.

Another aspect of the embodiments of this application further provides an apparatus for obtaining a quantity of blind detection times, configured to perform the method for obtaining a quantity of blind detection times on the terminal device side in the foregoing embodiment, and having a same technical feature and technical effect. Details are not described in this application again.

Figure 11:
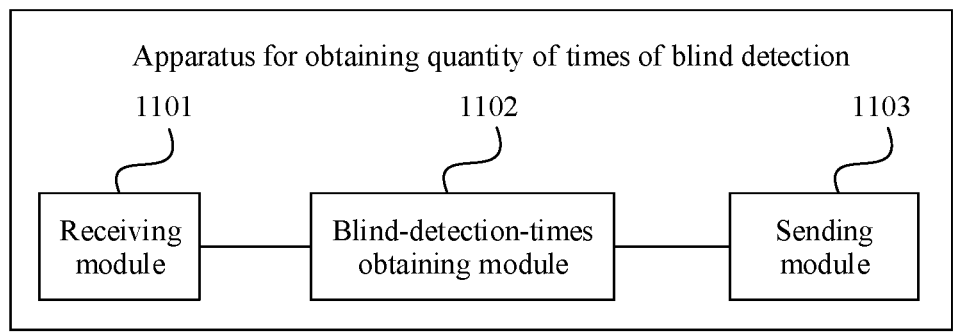
FIG. 11 is a schematic structural diagram of an apparatus for obtaining a quantity of blind detection times according to Embodiment 1 of this application.

FIG. 11 is a schematic structural diagram of an apparatus for obtaining a quantity of blind detection times according to Embodiment 1 of this application. In this embodiment, the apparatus for obtaining a quantity of blind detection times may be implemented by using software, hardware, or a combination of software and hardware. As shown in FIG. 11, the apparatus for obtaining a quantity of blind detection times includes:

a receiving module 1101, configured to receive second information from a network device, where the second information includes search space configuration information; and a blind detection times obtaining module 1102, configured to determine, based on the search space configuration information, a maximum quantity of blind detection times for the apparatus in a search space indicated by the search space configuration information.

Optionally, the search space configuration information includes at least one of the following:

subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

Optionally, the blind detection times obtaining module 1102 is specifically configured to: determine, based on the search space configuration information and multi-antenna configuration information of the apparatus, the maximum quantity of blind detection times for the apparatus in the search space indicated by the search space configuration information, where the multi-antenna configuration information includes at least one of the following: a quantity of antennas, a quantity of codewords, and a quantity of layers.

Optionally, the blind detection times obtaining module 1102 is specifically configured to: determine, based on a quantity of beams and/or transmission points that the apparatus needs to listen to and the search space configuration information, a maximum quantity of blind detection times for the apparatus on each beam and/or transmission point.

Optionally, the blind detection times obtaining module 1102 is specifically configured to: determine, based on information about a quantity of aggregated carriers and the search space configuration information, a maximum quantity of blind detection times for the apparatus in a search space on each carrier.

Optionally, as shown in FIG. 11, the apparatus for obtaining a quantity of blind detection times further includes:
a sending module 1103, configured to send, to the network device, a maximum quantity of blind detection times that can be supported by the apparatus.

Another aspect of the embodiments of this application further provides a downlink control information transmission apparatus, configured to perform the downlink control information transmission method on the network device side in the foregoing embodiment, and having a same technical feature and technical effect. Details are not described in this application again.

Figure 12:
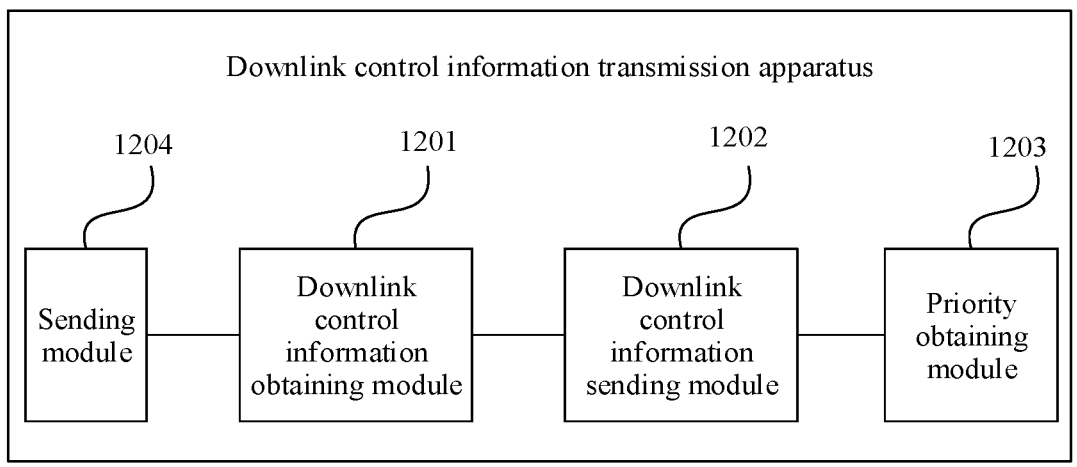
FIG. 12 is a schematic structural diagram of a downlink control information transmission apparatus according to Embodiment 3 of this application.

FIG. 12 is a schematic structural diagram of a downlink control information transmission apparatus according to Embodiment 3 of this application. In this embodiment, the downlink control information transmission apparatus may be implemented by using software, hardware, or a combination of software and hardware. As shown in FIG. 12, the downlink control information transmission apparatus includes:
a downlink control information obtaining module 1201, configured to determine to-be-sent downlink control information; and
a downlink control information sending module 1202, configured to send, based on first information, the downlink control information in at least two search spaces in a preset time duration, where
the first information is used to indicate a terminal device to receive the downlink control information in the at least two search spaces.

Optionally, any two of the at least two search spaces have different periods or have a same period and a same offset.

Optionally, the first information includes at least one of the following:
length information of the downlink control information, preset candidate location information, preset search space information, priority information of at least one of the search spaces, information about a preset aggregation level, or length alignment status information of the downlink control information.

Optionally, the first information includes the length information of the downlink control information, and the downlink control information sending module 1202 is specifically configured to send, in the at least two search spaces, the downlink control information of a length indicated by the length information.

Optionally, the length information of the downlink control information is any one of the following:

a smallest length value in lengths of the downlink control information, a largest length value in the lengths of the downlink control information, a length value of downlink control information in a rollback format, or a preset length value of the downlink control information.

Optionally, the first information includes the priority information of the at least one of the search spaces, and the downlink control information sending module 1202 is specifically configured to send, based on the priority information, the downlink control information in the at least two search spaces.

Optionally, as shown in FIG. 12, the downlink control information transmission apparatus further includes:
a priority obtaining module 1203, configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

Optionally, the first information includes the length alignment status information of the downlink control information, and the downlink control information sending module 1202 is specifically configured to send, when the first information indicates that the length of the downlink control information is aligned, the aligned downlink control information in the at least two search spaces.

Optionally, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

Optionally, as shown in FIG. 12, the downlink control information transmission apparatus further includes:
a sending module 1204, configured to send the first information to the terminal device.

Optionally, the downlink control information sending module 1202 is further configured to determine that a total maximum quantities of blind detection times that needs to be performed by the terminal device in the at least two search spaces is greater than a maximum quantity of blind detection times for the terminal device.

Optionally, the first information includes the preset candidate location information, and the downlink control information sending module 1202 is specifically configured to send the downlink control information in a candidate location indicated by the preset candidate location information in the at least two search spaces.

Optionally, the first information includes the preset search space information, and the downlink control information sending module 1202 is specifically configured to send the downlink control information in a preset search space indicated by the preset search space information in the at least two search spaces.

Optionally, the first information includes the information about the preset aggregation level, and the downlink control information sending module 1202 is specifically configured to send the downlink control information in a candidate location of the preset aggregation level in the at least two search spaces.

Another aspect of the embodiments of this application further provides an apparatus for obtaining a quantity of blind detection times, configured to perform the method for obtaining a quantity of blind detection times on the network device side in the foregoing embodiment, and having a same technical feature and technical effect. Details are not described in this application again.

Figure 13:
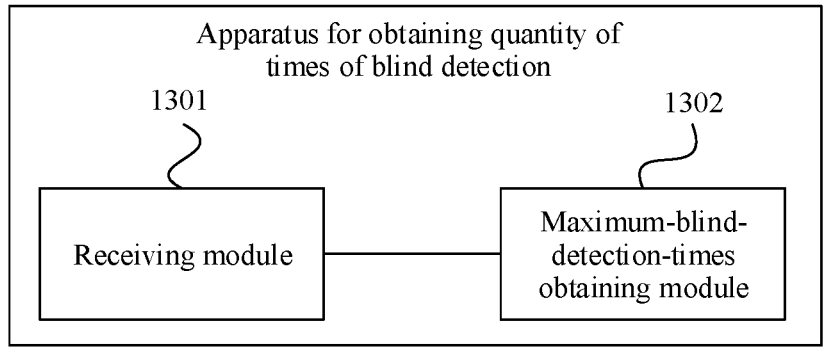
FIG. 13 is a schematic structural diagram of an apparatus for obtaining a quantity of blind detection times according to Embodiment 2 of this application.

FIG. 13 is a schematic structural diagram of an apparatus for obtaining a quantity of blind detection times according to Embodiment 2 of this application. In this embodiment, the apparatus for obtaining a quantity of blind detection times may be implemented by using software, hardware, or a combination of software and hardware. As shown in FIG. 13, the apparatus for obtaining a quantity of blind detection times includes:

a receiving module 1301, configured to receive a maximum quantity of blind detection times that is supported by a terminal device and that is from the terminal device; and a maximum-blind-detection-times obtaining module 1302, configured to determine, based on the maximum quantity of blind detection times and configuration information of a search space configured by the apparatus for the terminal device, a maximum quantity of blind detection times for the terminal device in the search space.

Optionally, the search space configuration information includes at least one of the following:

subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

Optionally, the maximum-blind-detection-times obtaining module 1302 is specifically configured to determine, based on the maximum quantity of blind detection times, the configuration information, and multi-antenna configuration information of the terminal device, the maximum quantity of blind detection times for the terminal device in the search space, where the multi-antenna configuration information includes at least one of the following: a quantity of antennas, a quantity of codewords, and a quantity of layers.

Optionally, the maximum-blind-detection-times obtaining module 1302 is specifically configured to: determine, based on the maximum quantity of blind detection times, a quantity of beams and/or transmission points that the terminal device needs to listen to and the configuration information, a maximum quantity of blind detection times for the terminal device on each beam and/or transmission point.

Optionally, the maximum-blind-detection-times obtaining module 1302 is specifically configured to: determine, based on the maximum quantity of blind detection times, information about a quantity of aggregated carriers and the configuration information, a maximum quantity of blind detection times for the terminal device in a search space on each carrier.

Another aspect of the embodiments of this application further provides a terminal device configured to perform the downlink control information transmission method in the foregoing embodiment, and having a same technical feature and technical effect. Details are not described in this application.

Figure 14:
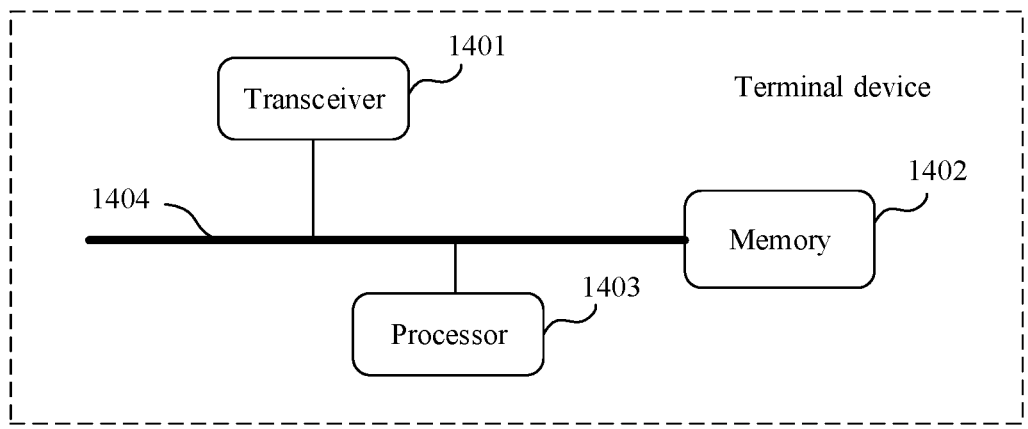
FIG. 14 is a schematic structural diagram of a terminal device according to Embodiment 1 of this application.

FIG. 14 is a schematic structural diagram of a terminal device according to Embodiment 1 of this application. As shown in FIG. 14, the terminal device includes: a transceiver 1401, a memory 1402, a processor 1403, and at least one communications bus 1404. The communications bus 1404 is configured to implement a communication connection between elements. The memory 1402 may include a high-speed random access memory, and may further include a non-volatile memory, for example, at least one disk memory. The memory 1402 may store various programs to complete various processing functions and implement method steps of this embodiment. The processor 1403 is configured to execute the programs stored in the memory 1402. In this embodiment, the transceiver 1401 may be a radio frequency processing module or a baseband processing module in the terminal device. The transceiver 1401 is coupled to the processor 1403.

The processor 1403 is configured to: determine that at least two search spaces exist in a preset time duration; and perform blind detection in the at least two search spaces based on first information, where the first information is used to indicate the terminal device to perform blind detection in the at least two search spaces, and a total quantities of blind detection times for the terminal device in the at least two search spaces does not exceed a maximum quantity of blind detection times for the terminal device in the preset time duration.

Optionally, any two of the at least two search spaces have different periods or have a same period and a same offset.

Optionally, the first information includes at least one of the following:

length information of downlink control information, preset candidate location information, preset search space information, priority information of at least one of the search spaces, information about a preset aggregation level, or length alignment status information of the downlink control information.

Optionally, the first information includes the length information of the downlink control information, and the processor 1403 is specifically configured to blindly detect, in the at least two search spaces, the downlink control information of a length indicated by the length information.

Optionally, the length information of the downlink control information is any one of the following:

a smallest length value in lengths of the downlink control information, a largest length value in the lengths of the downlink control information, a length value of downlink control information in a rollback format, or a preset length value of the downlink control information.

Optionally, the first information includes the priority information of the at least one of the search spaces, and the processor 1403 is specifically configured to: perform blind detection in the at least two search spaces based on the priority information.

Optionally, the processor 1403 is specifically configured to: sequentially perform blind detection in the at least two search spaces based on priorities in descending order until the downlink control information is detected, or the quantity of blind detection times reaches the maximum quantity of blind detection times for the terminal device, or the terminal device completes blind detection in the at least two search spaces.

Optionally, the processor 1403 is further configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

Optionally, the first information includes the length alignment status information of the downlink control information, and the processor 1403 is specifically configured to: blindly detect, when the first information indicates that the length of the downlink control information is aligned, the downlink control information in the at least two search spaces by using the aligned length of the downlink control information.

Optionally, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

Optionally, the terminal device further includes a transceiver 1401, configured to receive the first information from a network device.

Optionally, the processor 1403 is further configured to determine that the total quantities of blind detection times corresponding to the at least two search spaces is greater than the maximum quantity of blind detection times for the terminal device.

Optionally, the first information includes the preset candidate location information, and the processor 1403 is specifically configured to perform blind detection in a candidate location indicated by the preset candidate location information in the at least two search spaces.

Optionally, the first information includes the preset search space information, and the processor 1403 is specifically configured to perform blind detection in a preset search space indicated by the preset search space information in the at least two search spaces.

Optionally, the first information includes the information about the preset aggregation level, and the processor 1403 is specifically configured to blindly detect a candidate location of the preset aggregation level in the at least two search spaces.

Another aspect of the embodiments of this application further provides a terminal device, configured to perform the method for obtaining a quantity of blind detection times in the foregoing embodiment, and having a same or similar technical feature and technical effect. As shown in FIG. 14, the terminal device includes:
- a transceiver 1401, configured to receive second information from a network device, where the second information includes search space configuration information; and
- a processor 1403, configured to determine, based on the search space configuration information, a maximum quantity of blind detection times for the terminal device in a search space indicated by the search space configuration information.

Optionally, the search space configuration information includes at least one of the following:
- subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

Optionally, the processor 1403 is specifically configured to: determine, based on the search space configuration information and multi-antenna configuration information of the terminal device, the maximum quantity of blind detection times for the terminal device in the search space indicated by the search space configuration information, where the multi-antenna configuration information includes at least one of the following: a quantity of antennas, a quantity of codewords, and a quantity of layers.

Optionally, the processor 1403 is specifically configured to: determine, based on a quantity of beams and/or transmission points that the terminal device needs to listen to and the search space configuration information, a maximum quantity of blind detection times for the terminal device on each beam and/or transmission point.

Optionally, the processor 1403 is specifically configured to: determine, based on information about a quantity of aggregated carriers and the search space configuration information, a maximum quantity of blind detection times for the terminal device in a search space on each carrier.

Optionally, the terminal device further includes:
- a transceiver 1401, configured to send, to the network device, a maximum quantity of blind detection times that can be supported by the terminal device.

Another aspect of the embodiments of this application further provides a network device configured to perform the downlink control information transmission method in the foregoing embodiment, having a same technical feature and technical effect. Details are not described in this application.

Figure 15:
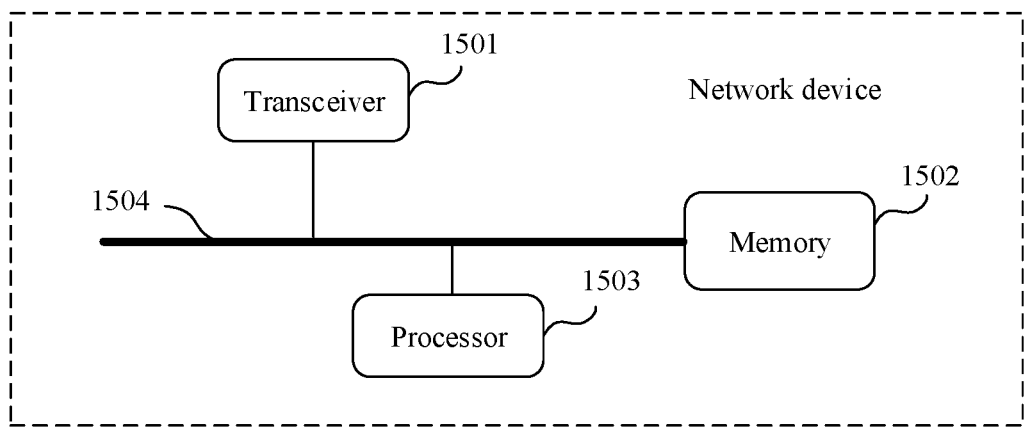
FIG. 15 is a schematic structural diagram of a network device according to Embodiment 1 of this application.

FIG. 15 is a schematic structural diagram of a network device according to Embodiment 1 of this application. As shown in FIG. 15, the network device includes: a transceiver 1501, a memory 1502, a processor 1503, and at least one communications bus 1504. The communications bus 1504 is configured to implement a communication connection between elements. The memory 1502 may include a high-speed random access memory, and may further include a non-volatile memory, for example, at least one disk memory. The memory 1502 may store various programs to complete various processing functions and implement method steps of this embodiment. The processor 1503 is configured to execute the programs stored in the memory 1502. In this embodiment, the transceiver 1501 may be a radio frequency processing module or a baseband processing module in the network device. The transceiver 1501 is coupled to the processor 1503.

The processor 1503 is configured to: determine to-be-sent downlink control information; and
- send, based on first information, the downlink control information in at least two search spaces in a preset time duration, where the first information is used to indicate a terminal device to receive the downlink control information in the at least two search spaces.

Optionally, any two of the at least two search spaces have different periods or have a same period and a same offset.

Optionally, the first information includes at least one of the following:
- length information of the downlink control information, preset candidate location information, preset search space information, priority information of at least one of the search spaces, information about a preset aggregation level, or length alignment status information of the downlink control information.

Optionally, the first information includes the length information of the downlink control information, and the processor 1503 is specifically configured to send, in the at least two search spaces, the downlink control information of a length indicated by the length information.

Optionally, the length information of the downlink control information is any one of the following:

a smallest length value in lengths of the downlink control information, a largest length value in the lengths of the downlink control information, a length value of downlink control information in a rollback format, or a preset length value of the downlink control information.

Optionally, the first information includes the priority information of the at least one of the search spaces, and the processor 1503 is specifically configured to send, based on the priority information, the downlink control information in the at least two search spaces.

Optionally, the processor 1503 is further configured to determine the priorities of the search spaces based on at least one of the following: information about types of the search spaces, the periods of the search spaces, subcarrier spacing information of the search spaces, information about symbols occupied by the search spaces, or information about start locations of the search spaces in a slot.

Optionally, the first information includes the length alignment status information of the downlink control information, and the processor 1503 is specifically configured to send, when the first information indicates that the length of the downlink control information is aligned, the aligned downlink control information in the at least two search spaces.

Optionally, the length alignment status information of the downlink control information is used to indicate that the length of the downlink control information is aligned with that of downlink control information with a largest length in the downlink control information or indicate that the length of the downlink control information in the rollback format is aligned with a length of downlink control information in a configuration format.

Optionally, the network device further includes:

a transceiver 1501, configured to send the first information to the terminal device.

Optionally, the processor 1503 is further configured to determine that a total maximum quantities of blind detection times that needs to be performed by the terminal device in the at least two search spaces is greater than a maximum quantity of blind detection times for the terminal device.

Optionally, the first information includes the preset candidate location information, and the processor 1503 is specifically configured to send the downlink control information in a candidate location indicated by the preset candidate location information in the at least two search spaces.

Optionally, the first information includes the preset search space information, and the processor 1503 is specifically configured to send the downlink control information in a preset search space indicated by the preset search space information in the at least two search spaces.

Optionally, the first information includes the information about the preset aggregation level, and the processor 1503 is specifically configured to send the downlink control information in a candidate location of the preset aggregation level in the at least two search spaces.

Another aspect of the embodiments of this application further provides a network side device, configured to perform the method for obtaining a quantity of blind detection times in the foregoing embodiment, and having a same or similar technical feature and technical effect. As shown in FIG. 15, the network device includes:

a transceiver 1501, configured to receive a maximum quantity of blind detection times that is supported by a terminal device and that is from the terminal device; and a processor 1503, configured to determine, based on the maximum quantity of blind detection times and configuration information of a search space configured by the network device for the terminal device, a maximum quantity of blind detection times for the terminal device in the search space.

Optionally, the search space configuration information includes at least one of the following:

subcarrier spacing information, slot type information, symbol quantity information, bandwidth information, resource block quantity information, resource element group quantity information, bound-resource-element-group quantity information, control channel element quantity information, type information of the search space, type information of aggregation levels included in the search space, length type information of downlink control information in the search space, mini slot indication information, or information about a quantity of slots included in an aggregated slot.

Optionally, the processor 1503 is specifically configured to determine, based on the maximum quantity of blind detection times, the configuration information, and multi-antenna configuration information of the terminal device, the maximum quantity of blind detection times for the terminal device in the search space, where the multi-antenna configuration information includes at least one of the following: a quantity of antennas, a quantity of codewords, and a quantity of layers.

Optionally, the processor 1503 is specifically configured to: determine, based on the maximum quantity of blind detection times, a quantity of beams and/or transmission points that the terminal device needs to listen to and the configuration information, a maximum quantity of blind detection times for the terminal device on each beam and/or transmission point.

Optionally, the processor 1503 is specifically configured to: determine, based on the maximum quantity of blind detection times, information about a quantity of aggregated carriers and the configuration information, a maximum quantity of blind detection times for the terminal device in a search space on each carrier.

An embodiment of this application further provides a program. The program is configured to perform, when executed by a processor, the downlink control information transmission method on the terminal device side in the foregoing embodiment. An embodiment of this application further provides a program product such as a computer-readable storage medium, including the foregoing program. An embodiment of this application further provides a computer-readable storage medium. The computer-readable storage medium stores an instruction. When the instruction is run on a computer, the computer is enabled to perform the downlink control information transmission method on the terminal device side in the foregoing embodiment.

An embodiment of this application further provides a program. The program is configured to perform, when executed by a processor, the method for obtaining a quantity of blind detection times on the terminal device side in the foregoing embodiment. An embodiment of this application further provides a program product such as a computer-readable storage medium, including the foregoing program. An embodiment of this application further provides a computer-readable storage medium. The computer-readable storage medium stores an instruction. When the instruction is run on a computer, the computer is enabled to perform the method for obtaining a quantity of blind detection times on the terminal device side in the foregoing embodiment.

An embodiment of this application further provides a program. The program is configured to perform, when executed by a processor, the downlink control information transmission method on the network device side in the foregoing embodiment. An embodiment of this application further provides a program product such as a computer-readable storage medium, including the foregoing program. An embodiment of this application further provides a computer-readable storage medium. The computer-readable storage medium stores an instruction. When the instruction is run on a computer, the computer is enabled to perform the downlink control information transmission method on the network device side in the foregoing embodiment.

An embodiment of this application further provides a program. The program is configured to perform, when executed by a processor, the method for obtaining a quantity of blind detection times on the network device side in the foregoing embodiment. An embodiment of this application further provides a program product such as a computer-readable storage medium, including the foregoing program. An embodiment of this application further provides a computer-readable storage medium. The computer-readable storage medium stores an instruction. When the instruction is run on a computer, the computer is enabled to perform the method for obtaining a quantity of blind detection times on the network device side in the foregoing embodiment.

In addition, it should be noted and understood that modules division of the foregoing network device and terminal device is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in this application may be integrated into one processing unit, or each of the units may exist alone physically, or two or more units are integrated into one unit. The integrated unit may be implemented in a form of hardware, or may be implemented in a form of hardware in addition to a software functional unit.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:
1. A method, wherein the method comprises:
receiving, by a terminal device, subcarrier spacing information from a network device;
sending, by the terminal device to the network device, information related to a maximum quantity of blind detection times supported by the terminal device;
determining, by the terminal device based on information about a quantity of aggregated carriers and the subcarrier spacing information, a maximum quantity of blind detection times for the terminal device on each of a plurality of carriers; and
monitoring, by the terminal device based on the maximum quantity of blind detection times for the terminal device on each of the plurality of carriers, physical downlink control channels (PDCCHs) on the plurality of carriers, wherein a total number of the blind detection times on the plurality of carriers does not exceed the maximum quantity of blind detection times supported by the terminal device, a quantity of blind detection times for the terminal device on each of the plurality of carriers does not exceed the maximum quantity of blind detection times for the terminal device on each of the plurality of carriers, and does not exceed the maximum quantity of blind detection times supported by the terminal device divided by the number of the plurality of carrier.

2. The method according to claim 1, wherein when a subcarrier spacing indicated by the subcarrier spacing information is greater than 15 kHz, the maximum quantity of blind detection times for the terminal device on each of the plurality of carriers is less than 44; and
when a subcarrier spacing indicated by the subcarrier spacing information is 15 kHz, the maximum quantity of blind detection times for the terminal device on each of the plurality of carriers is 44.

3. The method according to claim 1, wherein a larger subcarrier spacing indicated by the subcarrier spacing information indicates a smaller maximum quantity of blind detection times.

4. An apparatus, comprising:
one or more processors; and
a non-transitory computer-readable storage medium storing program instructions for execution by the one or more processors, wherein the program instructions instruct the apparatus to perform operations comprising:
receiving subcarrier spacing information from a network device;
sending, to the network device, information related to a maximum quantity of blind detection times supported by the apparatus;
determining, based on information about a quantity of aggregated carriers and the subcarrier spacing information, a maximum quantity of blind detection times for the apparatus on each of a plurality of carriers; and
monitoring, based on the maximum quantity of blind detection times for the apparatus on each of the plurality of carriers, physical downlink control channels (PDCCHs) on the plurality of carriers, wherein a total number of the blind detection times on the plurality of carriers does not exceed the maximum quantity of blind detection times supported by the apparatus, a quantity of blind detection times for the apparatus on each of the plurality of carriers does not exceed the maximum quantity of blind detection times for the apparatus on each of the plurality of carriers, and does not exceed the maximum quantity of blind detection times supported by the apparatus divided by the number of the plurality of carrier.

5. The apparatus according to claim 4, wherein when a subcarrier spacing indicated by the subcarrier spacing information is greater than 15 kHz, the maximum quantity of blind detection times for the apparatus on each of the plurality of carriers is less than 44; and when a subcarrier spacing indicated by the subcarrier spacing information is 15 kHz, the maximum quantity of blind detection times for the apparatus on each of the plurality of carriers is 44.

6. The apparatus according to claim 4, wherein a larger subcarrier spacing indicated by the subcarrier spacing information indicates a smaller maximum quantity of blind detection times.

7. A method, wherein the method comprises:

receiving, by a network device, information related to a maximum quantity of blind detection times supported by a terminal device; and sending, by the network device, subcarrier spacing information to the terminal device, wherein the subcarrier spacing information is used for determining a maximum quantity of blind detection times for the terminal device on each of a plurality of carriers, and wherein when the terminal device monitors physical downlink control channels (PDCCHs) on the plurality of carriers, a total number of the blind detection times on the plurality of carriers does not exceed the maximum quantity of blind detection times supported by the terminal device, a quantity of blind detection times for the terminal device on each of the plurality of carriers does not exceed the maximum quantity of blind detection times for the terminal device on each of the plurality of carriers, and does not exceed the maximum quantity of blind detection times supported by the terminal device divided by the number of the plurality of carrier.

8. The method according to claim 7, wherein when a subcarrier spacing indicated by the subcarrier spacing information is greater than 15 kHz, the maximum quantity of blind detection times for the terminal device on each of the plurality of carriers is less than 44; and when a subcarrier spacing indicated by the subcarrier spacing information is 15 kHz, the maximum quantity of blind detection times for the terminal device on each of the plurality of carriers is 44.

9. The method according to claim 7, wherein a larger subcarrier spacing indicated by the subcarrier spacing information indicates a smaller maximum quantity of blind detection times.

10. An apparatus, comprising:

one or more processors; and a non-transitory computer-readable storage medium storing program instructions for execution by the one or more processors, wherein the program instructions instruct the apparatus to perform operations comprising:

receiving information related to a maximum quantity of blind detection times supported by a terminal device; and sending subcarrier spacing information to the terminal device, wherein the subcarrier spacing information is used for determining a maximum quantity of blind detection times for a terminal device on each of a plurality of carriers, and wherein when the terminal device monitors physical downlink control channels (PDCCHs) on the plurality of carriers, a total number of the blind detection times on the plurality of carriers does not exceed the maximum quantity of blind detection times supported by the terminal device, a quantity of blind detection times for the terminal device on each of the plurality of carriers does not exceed the maximum quantity of blind detection times for the terminal device on each of the plurality of carriers, and does not exceed the maximum quantity of blind detection times supported by the terminal device divided by the number of the plurality of carrier.

11. The apparatus according to claim 10, wherein when a subcarrier spacing indicated by the subcarrier spacing information is greater than 15 kHz, the maximum quantity of blind detection times for the apparatus on each of the plurality of carriers is less than 44; and when a subcarrier spacing indicated by the subcarrier spacing information is 15 kHz, the maximum quantity of blind detection times for the apparatus on each of the plurality of carriers is 44.

12. The apparatus according to claim 10, wherein a larger subcarrier spacing indicated by the subcarrier spacing information indicates a smaller maximum quantity of blind detection times.

* * * * *